United States Patent [19]
Kikuchi et al.

[11] Patent Number: 5,078,229
[45] Date of Patent: Jan. 7, 1992

[54] FOUR-WHEEL-DRIVE MOTOR VEHICLE OF TRANSVERSELY-DISPOSED ENGINE TYPE

[75] Inventors: Reiji Kikuchi; Naomune Moriyama; Takahito Yokouchi; Koichi Yamamoto, all of Hiroshima, Japan

[73] Assignee: Mazda Motor Corporation, Japan

[21] Appl. No.: 502,219

[22] Filed: Mar. 30, 1990

[30] Foreign Application Priority Data

Mar. 31, 1989 [JP] Japan .................................. 1-82936
Apr. 26, 1989 [JP] Japan ................................ 1-108286

[51] Int. Cl.⁵ .......................................... B60K 17/344
[52] U.S. Cl. ..................................... 180/248; 180/297
[58] Field of Search ............... 180/297, 247, 248, 249, 180/250; 74/711, 710.5, 714, 701

[56] References Cited

U.S. PATENT DOCUMENTS 4,650,202  3/1987  Tsuzuki ............................... 180/248
4,716,984  1/1988  Hiramatsu et al. ................. 180/297
4,874,059  10/1989  Kasegawa ........................... 180/249

FOREIGN PATENT DOCUMENTS 6323219  10/1984  Japan .
60-179334  9/1985  Japan .
63-103735  10/1986  Japan .

Primary Examiner—Andres Kashnikow
Assistant Examiner—Richard Camby
Attorney, Agent, or Firm—Thompson, Hine and Flory

[57] ABSTRACT

A four-wheel-drive motor vehicle with a transversely-disposed engine of such construction that a front differential which distributes motive power from a center differential to the right and left front wheels is arranged on the front axle and in the rear of the front differential, an engine and a transmission are arranged. By this arrangement, one-sidedness of the vehicle body weight to the front wheels can be relieved.

12 Claims, 23 Drawing Sheets

FOUR-WHEEL-DRIVE MOTOR VEHICLE OF TRANSVERSELY-DISPOSED ENGINE TYPE

BACKGROUND OF THE INVENTION

1. Field of the Invention

This invention relates to a four-wheel-drive motor vehicle with an engine which is disposed transversely at the front part of the vehicle body.

2. Description of the Prior Art

Generally, as disclosed by Japanese Patent Application Laying Open Gazette No. 60-179334, for example, the four-wheel-drive motor vehicle with a transversely-disposed engine has such a layout that a center differential which distributes driving torque from a transmission to the front wheel side and the rear wheel side and a front differential which distributes a part of driving torque from said center differential to the right and left front wheels are arranged coaxially on the axle line of the front wheels and in front of these differentials an engine and a transmission are disposed.

In the above case, however, as a power unit center which is the center of gravity of the engine and the transmission is positioned in the forward direction of the vehicle body from the front axle, the vehicle body weight acts on the front wheels fairly one-sidedly, with a bad influence on running stability, etc. This one-sidedness of the vehicle body weight to the front wheels is especially problematical to the high output of engine in recent years.

SUMMARY OF THE INVENTION

An object of the present invention is to relieve the one-sidedness of the vehicle body weight to the front wheels in the four-wheel-drive motor vehicle of a transversely-disposed engine type.

In order to attain the above object, the present invention provides such composition that a front differential which distributes motive power from a center differential to the right and left front wheels is arranged on the axle line of the front wheels and in the rear of said front differential, an engine and a transmission are arranged.

Under the above composition, a power unit center which is the center of gravity of the engine and the transmission is positioned in the rear direction of the vehicle body from the front axle, whereby one-sided action of the vehicle body weight on the front wheels can be relieved to such extent which corresponds to the shifting of the power unit center rearwardly.

The above and other objects, features and advantages of the present invention will be understood more clearly by reading the following description of preferred embodiments, with reference to the accompanying drawings.

BRIEF DESCRIPTION OF THE DRAWINGS

The attached drawings show preferred embodiments of the present invention.

FIG. 1 to FIG. 5 show the first embodiment of the present invention, in which FIG. 1 is a cross section, showing the composition of a main part of the four-wheel-drive system;

FIG. 2 is a skeleton drawing, showing the whole composition of the four-wheel-drive motor vehicle;

FIG. 3 is an arrangement drawing, showing the positional relation of each member, as viewed from the left side of the vehicle body;

FIG. 4 and FIG. 5 are a plan view and a side view respectively, each showing the arrangement of an engine, etc. at the front part of the vehicle body;

FIG. 8 is a cross section of a transfer mechanism, FIG. 9 corresponds to FIG. 3, FIG. 10 corresponds to FIG. 4, and FIG. 11 corresponds to FIG. 5;

FIG. 30 is a cross section of the transfer mechanism for front wheels, FIG. 31 corresponds to FIG. 4, and FIG. 32 corresponds to FIG. 5;

DETAILED EMBODIMENT OF THE INVENTION

A description is made below of preferred embodiments of the present invention, on the basis of the attached drawings.

Figure 2:
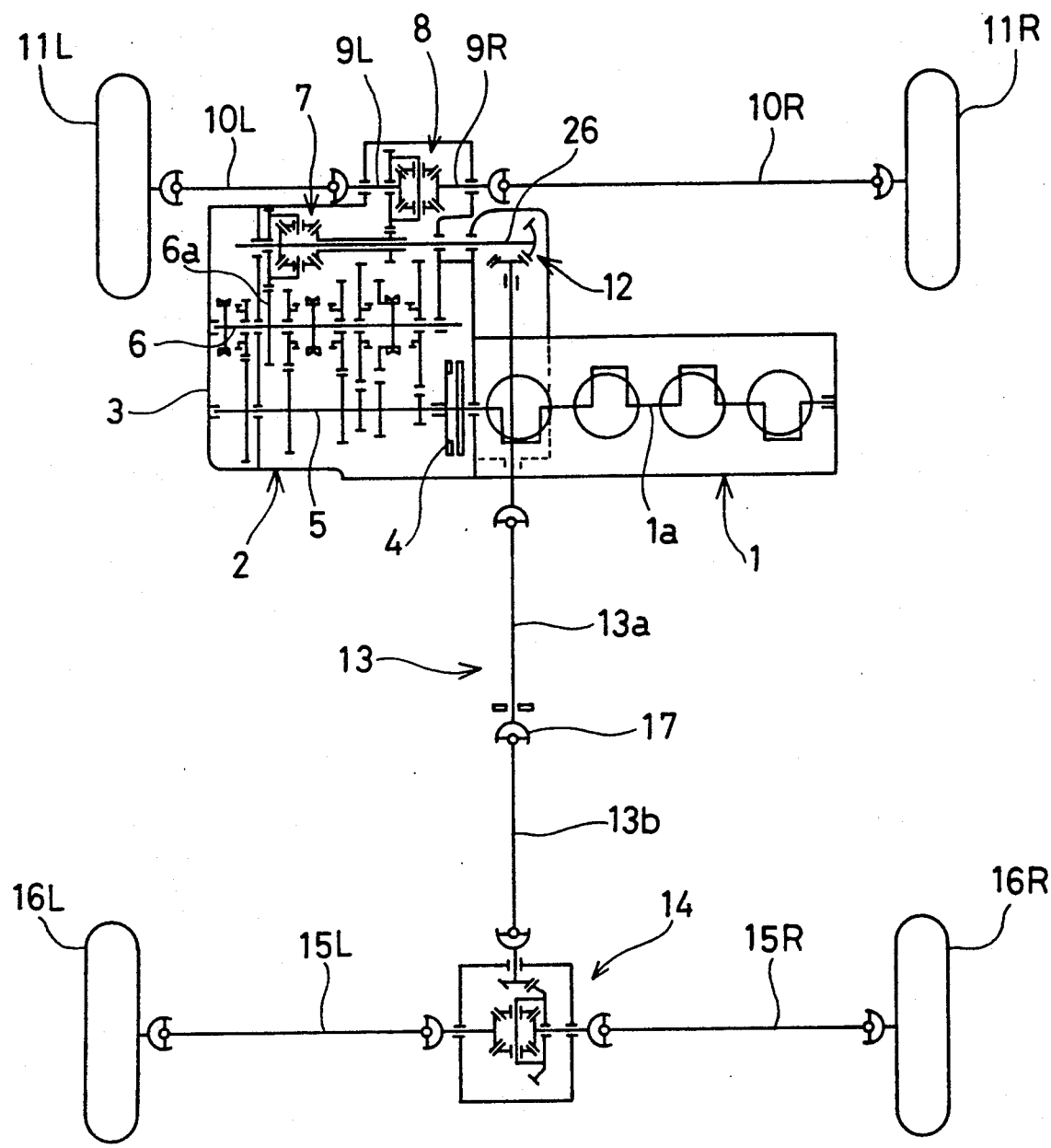

FIG. 2 shows a rough whole composition of a four-wheel-drive system of the first embodiment of the present invention. Reference number 1 designates a 4-cylindered engine mounted at the front part of the vehicle body. A crank shaft 1a which is an output shaft of the engine 1 is disposed transversely or extending in the direction of vehicle width. Reference number 2 designates a gear type transmission mounted transversely to the left side of the engine 1. This transmission 2 carries in a casing 3 a main shaft 5 which is connected to the crank shaft 1a of the engine 1 through the medium of a clutch system 4 and a secondary shaft 6 arranged in parallel with said main shaft 5. By means of changing a transmitting channel of a gear between both shafts 5, 6, a gear ratio or a transmission ratio is changed over.

Reference number 7 designates a center differential which distributes driving torque from the transmission 2 to the front wheel side and the rear wheel side. Reference number 8 designates a front differential which distributes a part of driving torque from the center differential 7 to the right and left front wheels 11L, 11R via shafts 9L, 9R and drive shafts 10L, 10R which are axles. The front differential 8 is arranged on the axle line of the front wheels 11L, 11R and in the rear direction of the vehicle body from said front differential 8, the engine 1 and the transmission 2 are arranged. The center differential 7 is arranged between the front differential 8 and the transmission 2 in the longitudinal direction of the vehicle body.

Reference number 12 designates a transfer mechanism. This transfer mechanism transmits the remaining part of driving torque from the center differential 7 to a propeller shaft 13 on the rear wheel side, extending in the longitudinal direction of the vehicle body. The propeller shaft 13 comprises plural (two in the drawing) shafts 13a, 13b which are connected to each other through the medium of a universal joint 17. A rear end of the propeller shaft 13 (shaft 13b) is connected to a rear differential 14, which distributes driving torque to the right and left rear wheels 16L, 16R via axles 15L, 15R.

Figure 1:
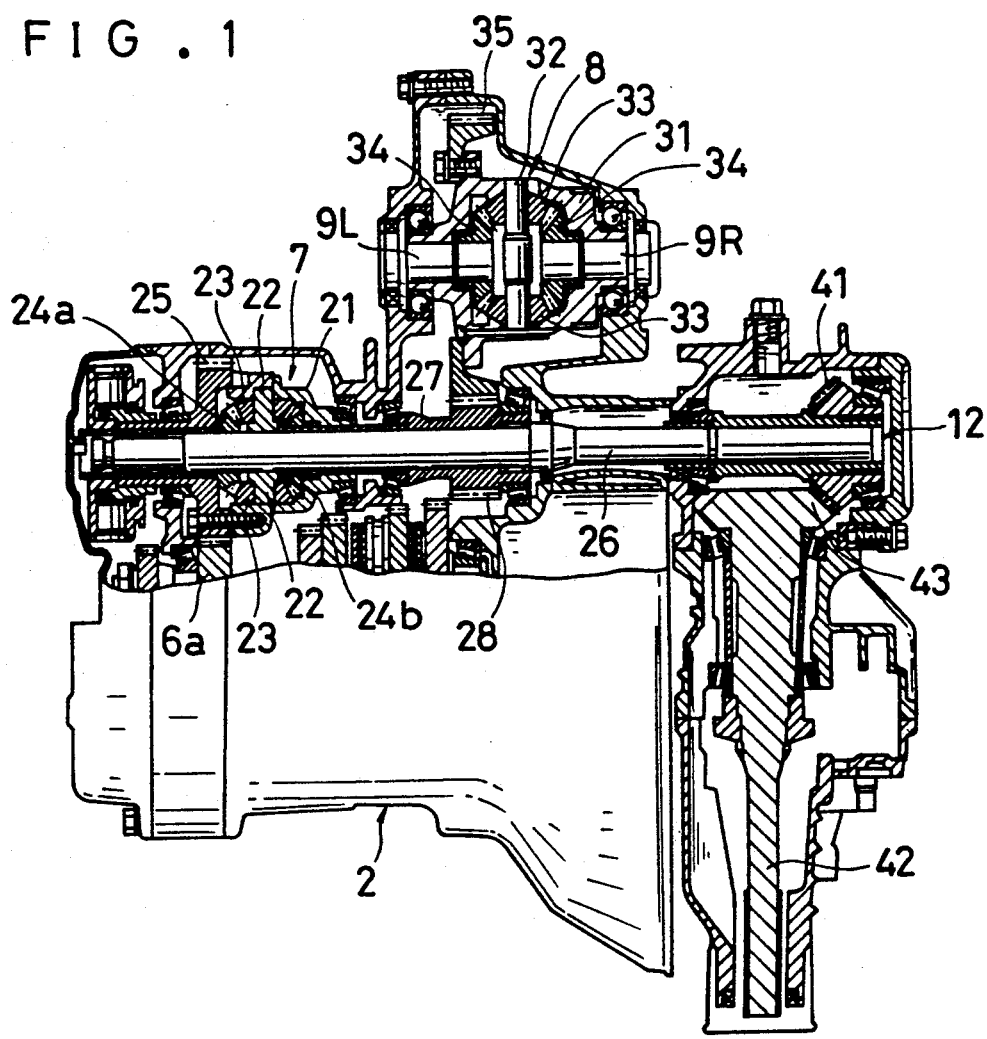

FIG. 1 shows a concrete construction of the center differential 7, the front differential 8 and the transfer mechanism 12. In FIG. 1, the center differential 7 is provided with a pair of pinion gears 23 supported rotatably by a differential case 21 through the medium of pinion gears 22 and a pair of side gears 24a, 24b, each of which meshes with the respective pinion gear 23. Provided in said differential case 21 is an input gear 25 which meshes with an output gear 6a on the secondary shaft 6 of the transmission 2. Driving torque from the transmission 2 is input as rotation of the differential case 21 through the medium of the input gear 25. Of said pair of side gears 24a, 24b, the side gear 24a is fitted in a center shaft 26 by the spline connection or other means so that it rotates integrally with the center shaft 26. The center shaft 26 is arranged in the casing 3 in such a state that it extends in the direction of vehicle width and in parallel with the main shaft 5 and the secondary shaft 6 (refer to FIG. 2) and is supported rotatably. The other side gear 24b is fitted rotatably in one end portion of a transmitting shaft 27 which is loosely fitted in the outer periphery of the center shaft 26 for relative rotation. An output gear 28 which outputs driving torque to the front differential 8 side is formed integrally with the other end portion of the transmitting shaft 27.

The front differential 8 carries a pair of pinion gears 33 supported rotatably by a differential case 31 through the medium of a pinion shaft 32 and a pair of side gars 34, each of which meshes with respective pinion gear 33 and is connected to one end (inner end) of the right and left shafts 9L, 9R. The differential case 31 is fitted rotatably to the shafts 9L, 9R and is provided with an input gear 35 which meshes with the output gear 28 on the center shaft 26. Driving torque from the center differential 7 is input as rotation of the differential case 31 through the medium of the input gear 35.

The transfer mechanism 12 carries a drive bevel gear 41 arranged at the inner side end portion of the center shaft 26 in the direction of vehicle width for integral rotation with the shaft 26 and a driven bevel gear 43 which is formed integrally with one end (front end) of a transfer shaft 42 and meshes with the drive bevel gear 41. The other end (rear end) of the transfer shaft 42 is connected to the propeller shaft 13 (shaft 13a).

Figure 3:
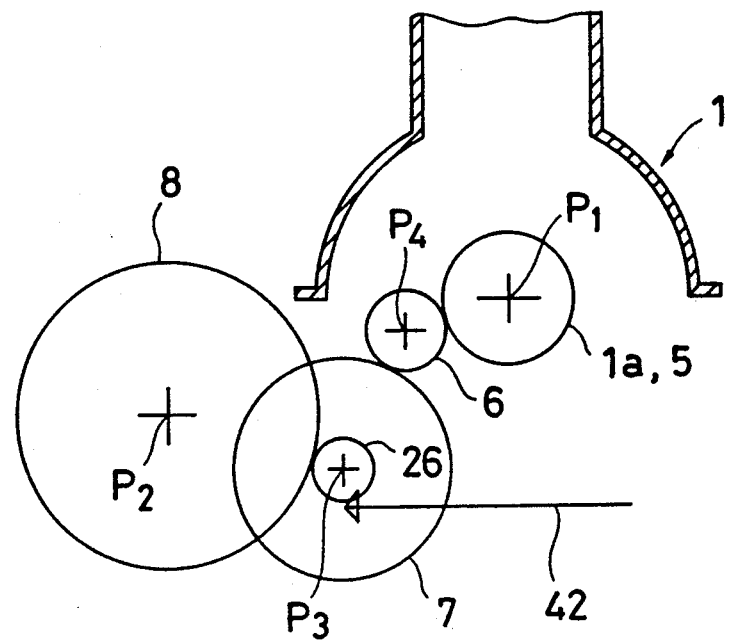
Figure 4:
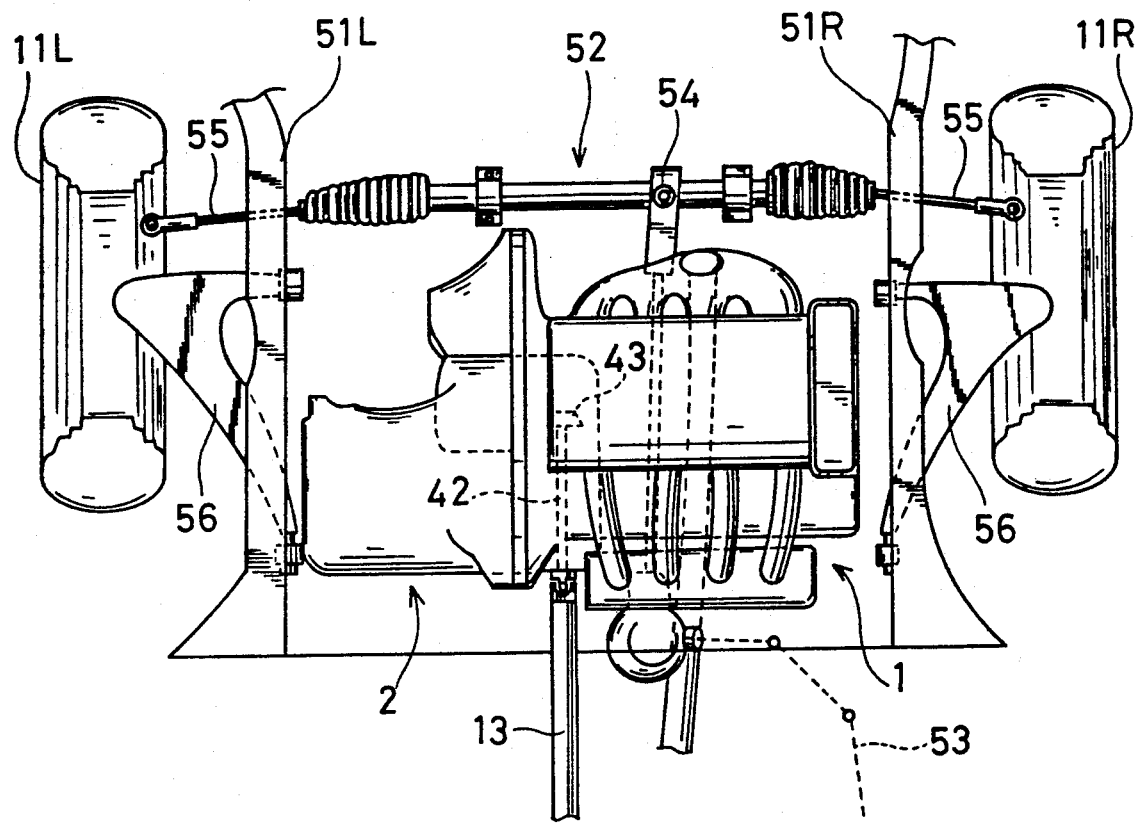
Figure 5:
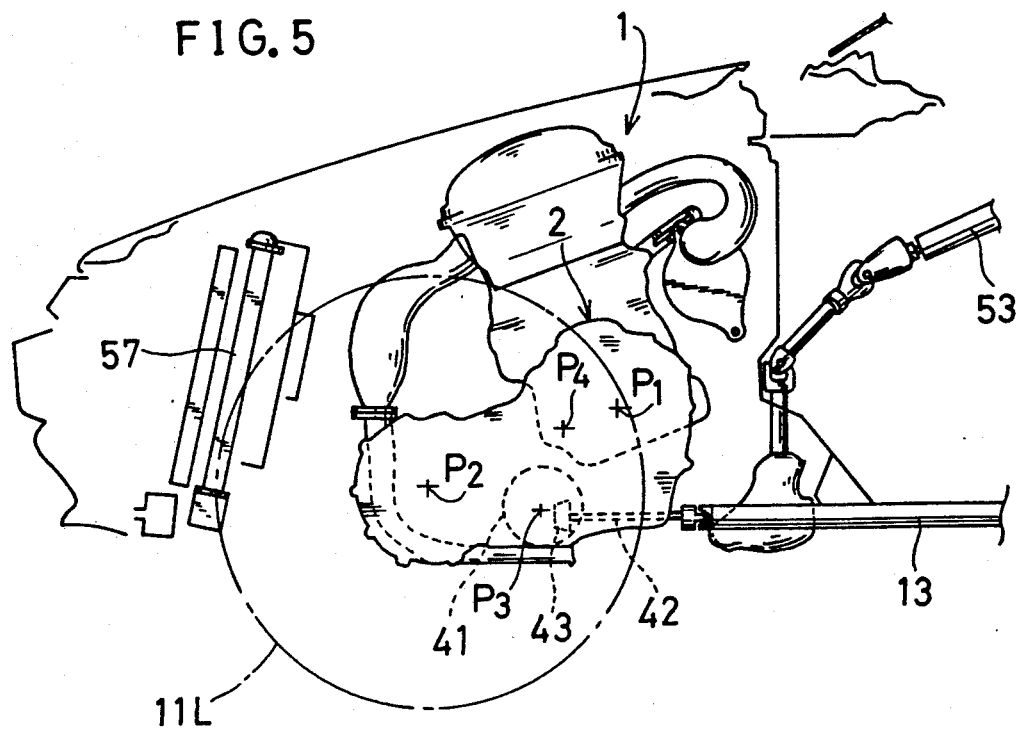

FIG. 3 to FIG. 5 show arrangements of the engine 1, the transmission 2, etc. at the front part of the vehicle body. In these figures, the engine 1 and the transmission 2 are supported on front frames 51L, 51R so that the axial center $P_1$ of the crank shaft 1a of the engine 1 and the main shaft 5 of the transmission 2 is positioned in the rear direction of the vehicle body from $P_2$ and above $P_2$ which is the axial center of the axle of front wheels 11L, 11R (namely, the center of the front differential 8) and the engine 1 is disposed in such a fashion that its upper side as viewed in the direction of the crank shaft (namely, the cylinder head side) inclines frontwardly and diagonally. $P_3$ which is the center of the center differential 7 and the axial center of the center shaft 26 is located in the rear direction of the vehicle body from $P_2$ and below $P_2$ which is the axial center of the axle of the front wheels 11L, 11R. $P_4$ which is the axial center of the secondary shaft 6 of the transmission 2 is located in the rear direction of the vehicle body from $P_3$ and above $P_3$ which is the center of the center differential 7 and the axial center of the center shaft 26. $P_1$ which is the axial center of the main shaft 5 of the transmission 2 is located in the rear direction of the vehicle body from $P_4$ which is the axial center of the secondary shaft 6.

The transfer shaft 42 and the propeller shaft 13 extend substantially horizontally in the rear direction of the vehicle body from the position slightly below $P_3$ which is the axial center of the center shaft 26. This transfer shaft 42, when viewed in plane, is arranged in the longitudinal direction of the vehicle body at the part on the transmission side of the engine 1.

In FIG. 4 and FIG. 5, reference number 52 designates a steering system. This steering system is so composed that it transmits steering power of a steering handle (not shown in the drawing) to the right and left front wheels 11L, 11R via a steering shaft 53, a rack and pinion mechanism 54 and tie rods 55, etc. so as to steer the front wheels 11L, 11R right and left. Reference number 56 designates a suspension arm which connects the front wheels 11L, 11R to the vehicle body (front frames 51L, 51R) and reference number 57 designates a radiator.

In the above first embodiment, since the engine 1 and the transmission 2 are arranged in the rear direction of the vehicle body from the axial center of the axle of the front wheels 11L, 11R (namely, $P_2$ which is the center of the front differential 8), this arrangement can relieve the one-sided action of the vehicle body weight on the front wheels 11L, 11R and contributes to the improvement of running stability, etc.

As the center differential 7 is arranged in the rear direction of the vehicle body from the front differential 8 and both the transmission 2 and the engine 1 are arranged in the rear direction of the vehicle body (by the space for arrangement of the center differential 7) from the axle of the front wheels 11L, 11R, one-sidedness of the vehicle body weight to the front wheels 11L, 11R can be relieved still more. The center differential 7 is intended for distributing a part of driving torque output from the transmission 2 to the front differential 8 and such members as arranging the transmission 2 and others in the more rear direction of the vehicle body are not required at all.

Since $P_3$ which is the center of the center differential 7 is offset below in relation to $P_1$ which is the axial center of the main shaft 5 of the transmission 2 and $P_4$ which is the axial center of the secondary shaft 6, in the transfer mechanism 12 which takes out motive power from the center differential 7 to the rear wheel side the transfer shaft 42 can be arranged below the transfer mechanism 12, free from the member interference with the shaft and the gear of the transmission 2. Thus, it is made possible to reduce the number of parts to be used and to facilitate taking out of motive power.

Figure 6:
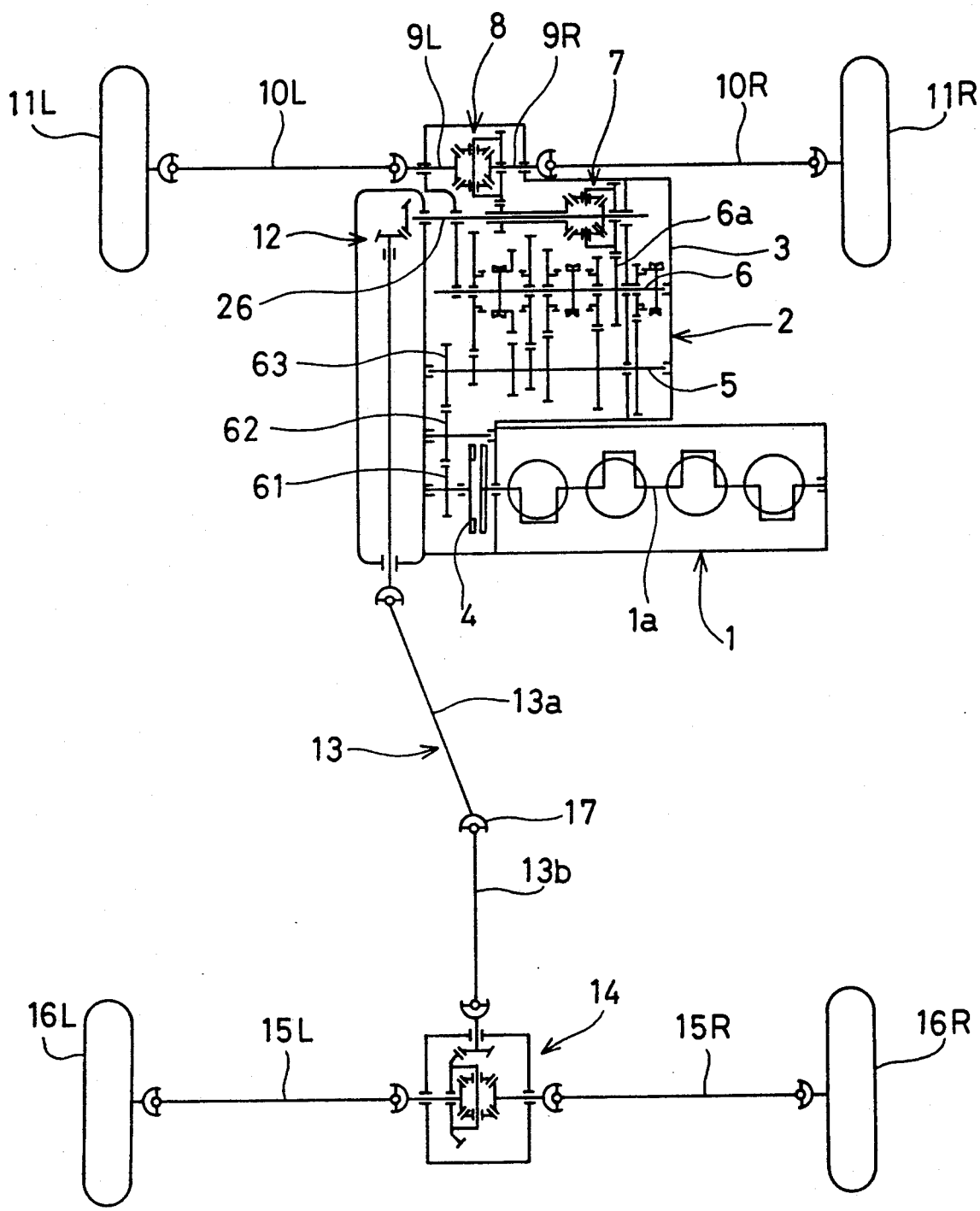
FIG. 6 to FIG. 11 show the second embodiment, in which FIG. 6 corresponds to FIG. 2, FIG. 7 corresponds to FIG. 1.
Figure 7:
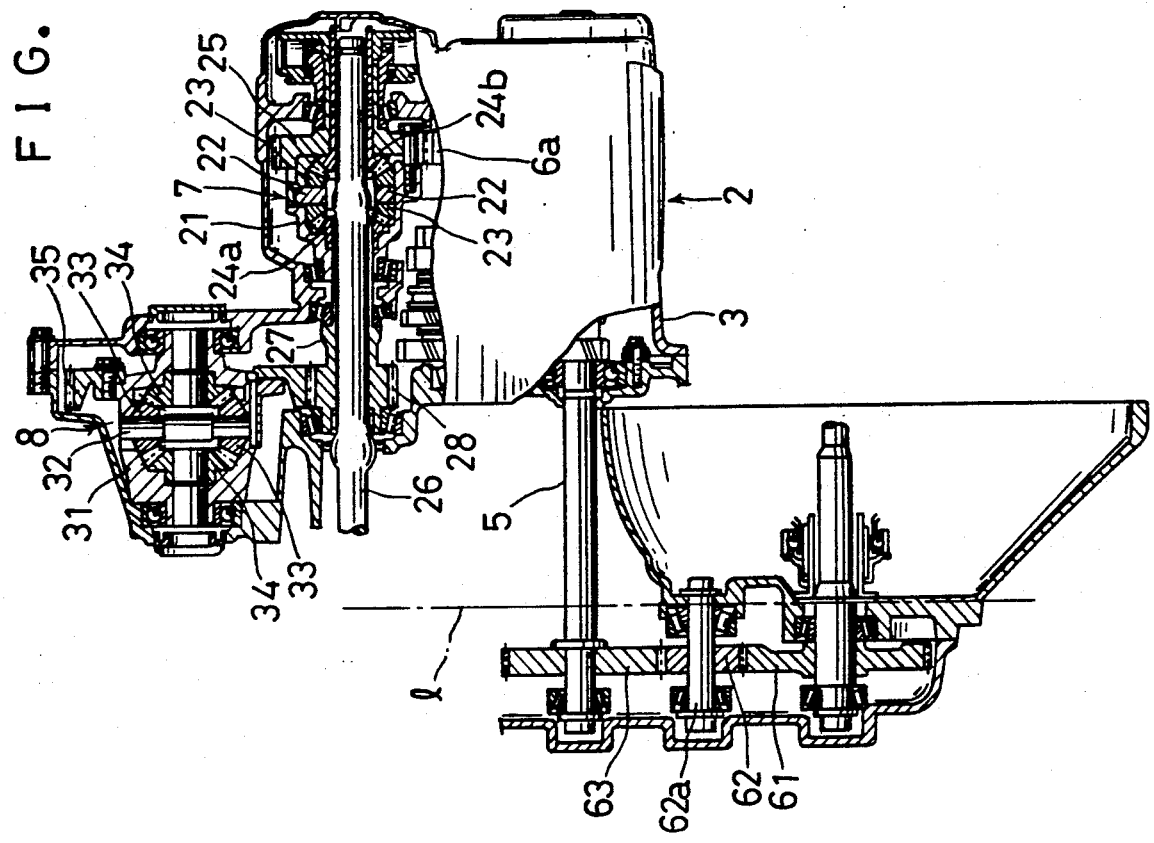
Figure 8:
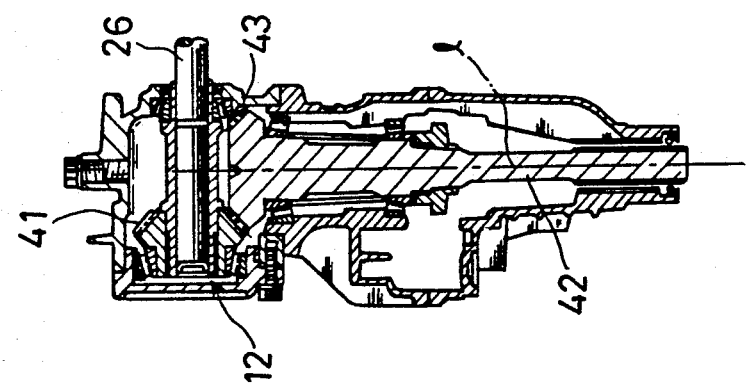

FIG. 6 to FIG. 8 show a four-wheel-drive system in the second embodiment of the present invention. In the case of this embodiment, it is so composed that while the transmission 2 is arranged in the forward direction of the vehicle body from the engine 1, driving torque of the engine 1 is transmitted from an output gear 61 disposed on the same axle line as the crank shaft 1a to an input gear 63 disposed rotatably with the main shaft 5 of the transmission 2 via an idle gear 62. The four-wheel-drive system and others in this embodiment are almost the same as those in the first embodiment. Like symbol numbers are given to the same members and explanation of them is omitted.

Figure 9:
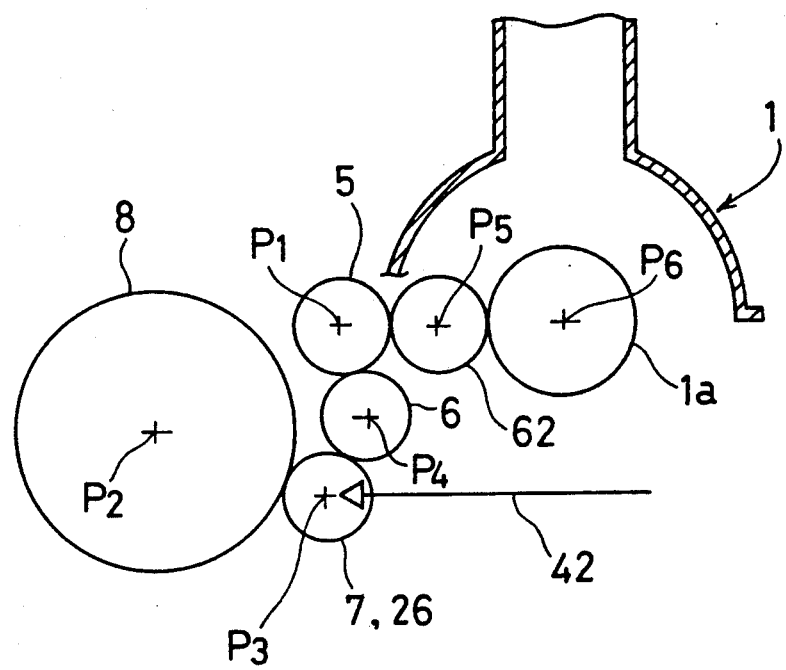
Figure 10:
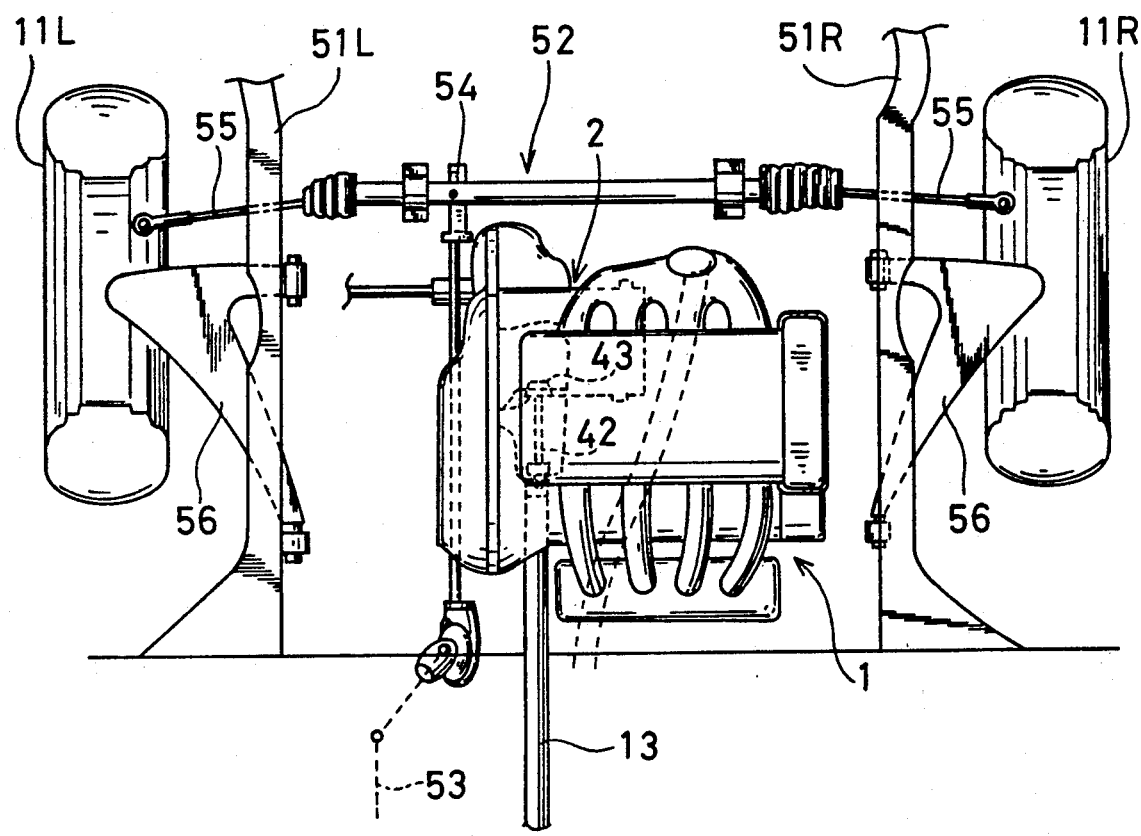
Figure 11:
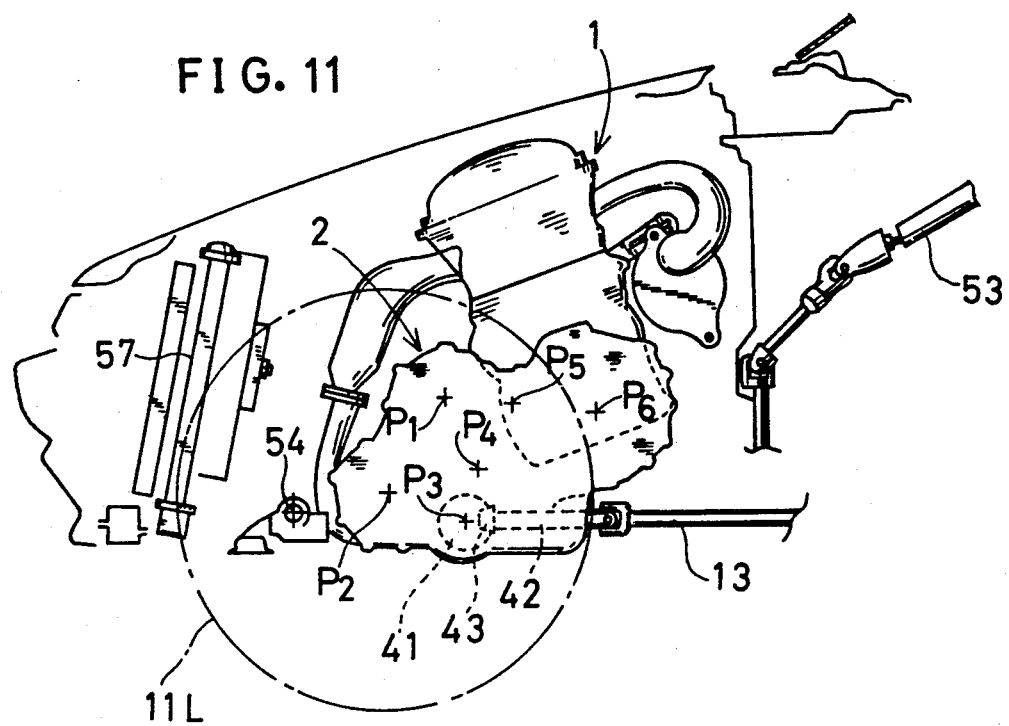

In the second embodiment, arrangements of the engine 1, the transmission 2, etc. at the front part of the vehicle body are shown in FIG. 9 to FIG. 11. $P_3$ which is the center of the center differential 7 and the axial center of the center shaft 26 is located in the rear direction of the vehicle body from $P_2$ and below $P_2$ which is the center of the front differential 8 positioned on the axle line of the front wheels 11L, 11R and $P_4$ which is the axial center of the secondary shaft 6 of the transmission 2 is located in the rear direction of the vehicle body from $P_3$ and above $P_3$ (in the rear direction of the vehicle body from $P_2$ which is the center of the front differential 8 and on almost the same level with $P_2$) which is the center of the center differential 7.

$P_1$ which is the axial center of the main shaft 5 of the transmission 2 is located substantially right above $P_4$ which is the axial center of the secondary shaft 6 of the transmission 2. $P_5$ which is the axial center of a support axis 62a (refer to FIG. 7) and $P_6$ which is the axial center of the crank shaft 1a of the engine 1 are located on the horizontal line in the rear direction of the vehicle body from $P_1$ which is the axial center of the main shaft 5 for the transmission 2. The transfer shaft 42 and the propeller shaft 13 are arranged in such a fashion that both extend almost horizontally in the rear direction of the vehicle body from the position which is almost the same level with $P_3$ which is the axial center of the center shaft 26. This transfer shaft 42, when viewed in plane, is arranged in such a fashion that its axial line l is located at one end portion of the engine 1 and the transmission 2 (more particularly, at the part which is more inner than a series of gear rows 61, 62, 63 in the main body), as shown in FIG. 7 and FIG. 8.

In the second embodiment, not only the transmission 2 is arranged in the rear direction of the vehicle body from the front differential 7, but also the engine 1 is arranged in the rear direction of the vehicle body from the transmission 2 and accordingly, the power unit center is located in the considerably rear direction of the vehicle body from the axial of the front wheels 11L, 11R. This arrangement can relieve further the one-sidedness of the vehicle body weight to the front wheels 11L, 11R.

Figure 12:
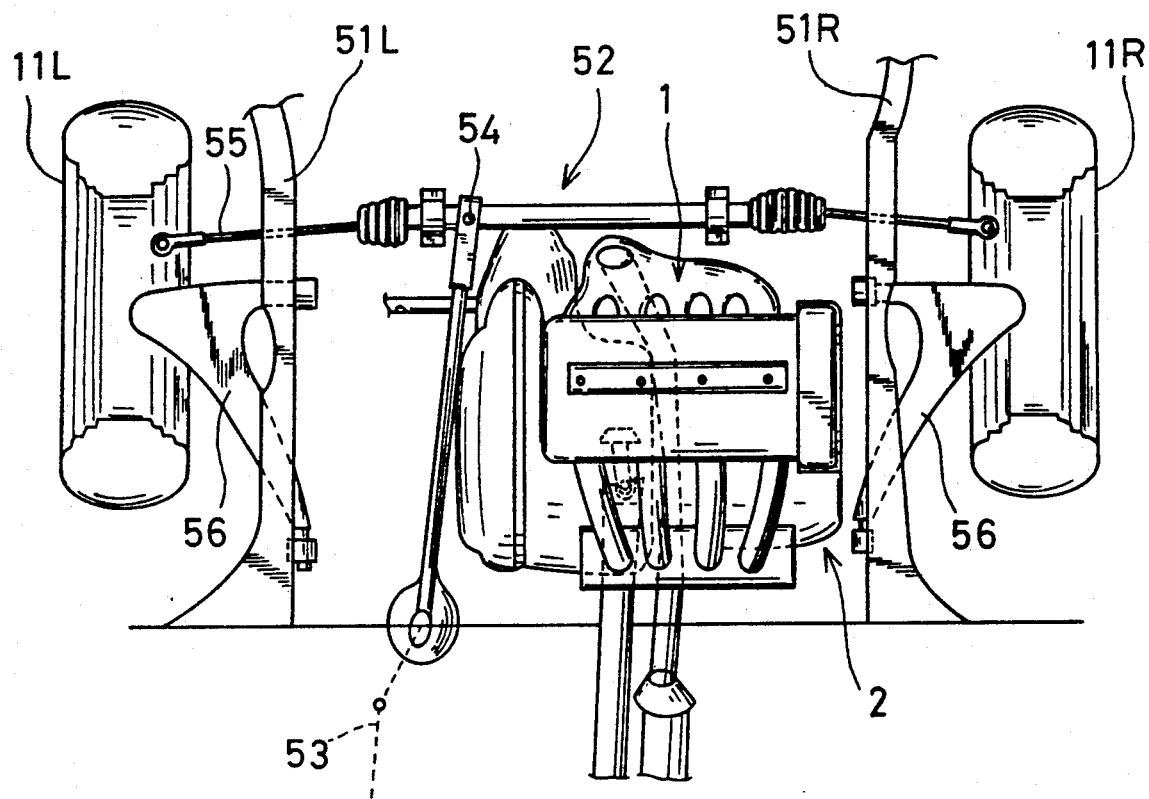
FIG. 12 and FIG. 13 show the third embodiment, in which FIG. 12 corresponds to FIG. 4 and FIG. 13 corresponds to FIG. 5.
Figure 13:
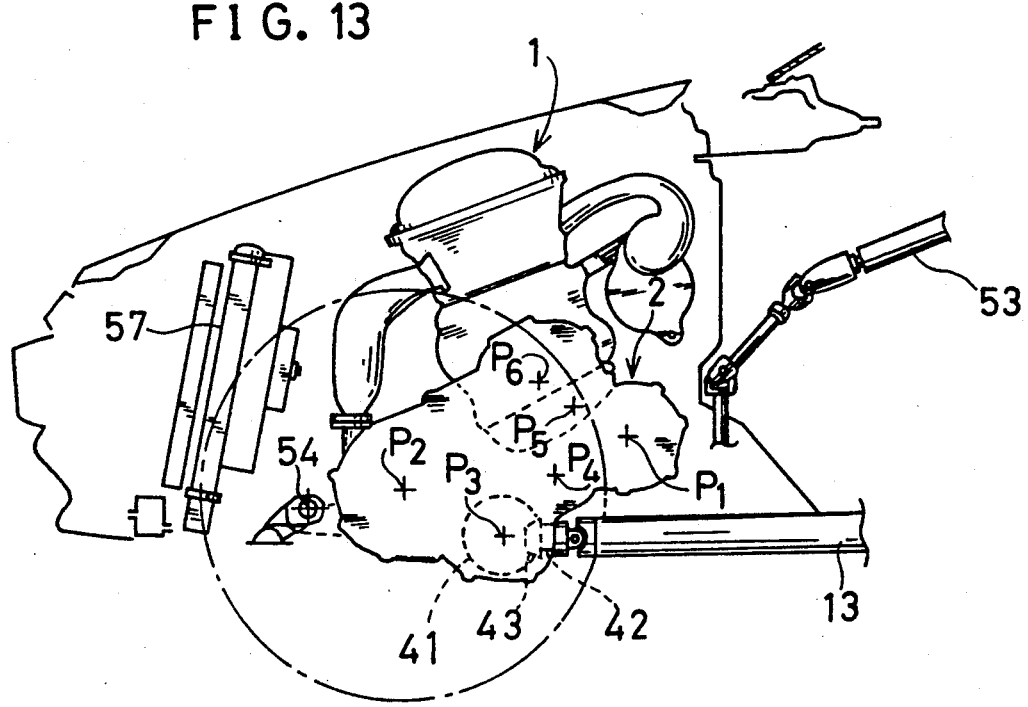
Figure 14:
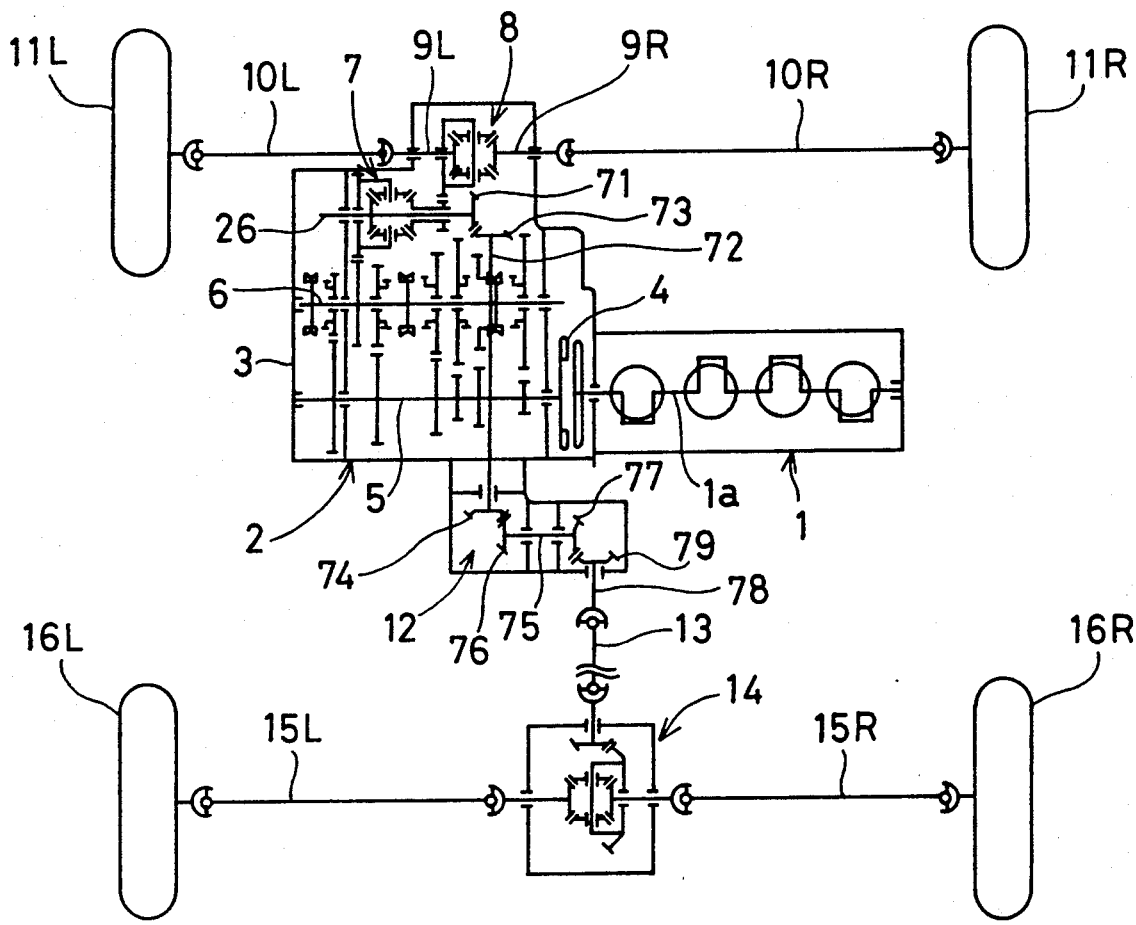
FIG. 14 To FIG. 17 show the fourth embodiment, in which FIG. 14 corresponds to FIG. 2, FIG. 15 corresponds to FIG. 3, FIG. 16 corresponds to FIG. 4, and FIG. 17 corresponds to FIG. 5.
Figure 15:
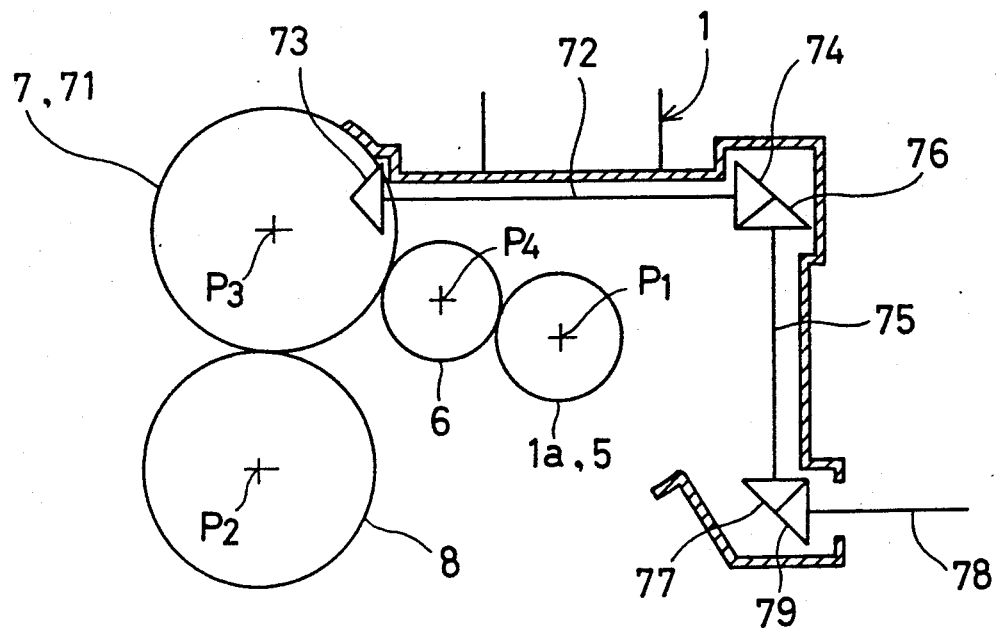
Figure 16:
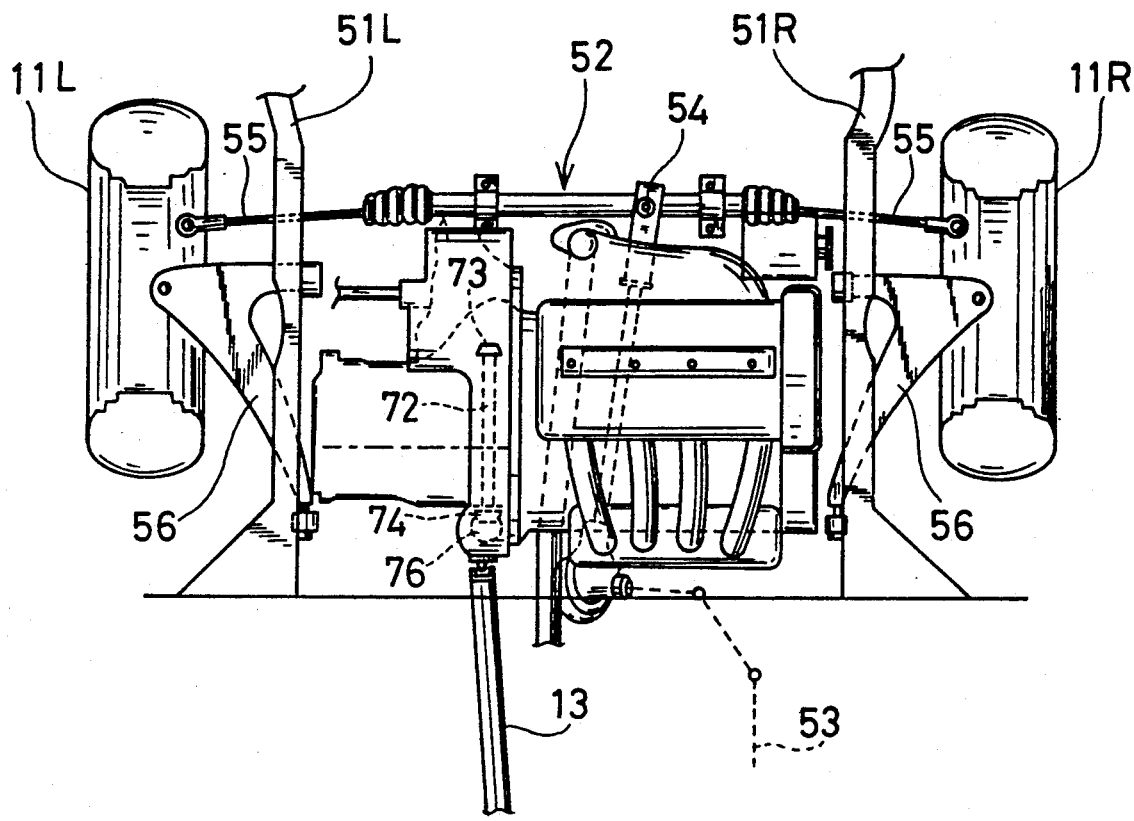
Figure 17:
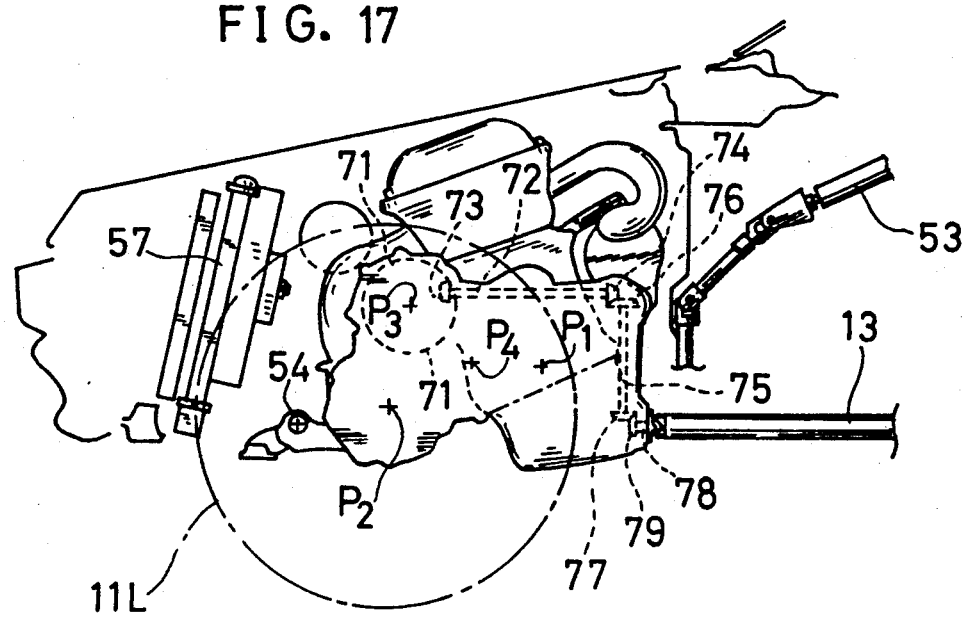

FIG. 12 and FIG. 13 show the third embodiment of the present invention. This embodiment is reverse to the second embodiment in respect of the arrangement of the engine 1 and the transmission 2, namely, $P_1$ which is the axial center of the main shaft 5 of the transmission 2 is located in the rear direction of the vehicle body from $P_6$ and below $P_6$ which is the axial center of the crank shaft 1a of the engine 1.

FIG. 14 to FIG. 17 show the fourth embodiment of the present invention. This embodiment is a modification of the construction of the first embodiment for taking out motive power from the center differential to the rear wheel side. $P_3$ which is the center of the center differential 7 is located above $P_2$ which is the center of the front differential 8 positioned on the axle line of the front wheels 11L, 11R. The transfer mechanism 12 which transmits driving torque from the center differential 7 to the propeller shaft 13 on the rear wheel side has a first bevel gear 71 arranged rotatably with the center shaft 26 located on the center line of the center differential 7, a second bevel gear 73 which is at a forward end of the first transfer shaft 72 extending in the longitudinal direction of the vehicle body and above the transmission 2 and the main shaft 5 and meshes with the first bevel gear 71, a third bevel gear 74 disposed at a rear end of the transfer shaft 72, a fourth bevel gear 76 disposed at an upper end of a second transfer shaft 75 extending in the vertical direction and in the rear of the main shaft 5 of the transmission 2, a fifth bevel gear 77 disposed at a lower end of the second transfer shaft 75 and a sixth bevel gear 79 disposed at a forward end of a third transfer shaft 78 extending in the longitudinal direction of the vehicle body and in the rear of the transmission 2. A rear end of the third transfer shaft 78 is connected to the propeller shaft 13.

FIG. 18 to FIG. 22 show the fifth embodiment of the present invention. In the case of this embodiment, composition of the four-wheel-drive system is quiet the same as the case of the first embodiment, with the exception that arrangements of the engine 1, the transmission 2, etc. at the front part of the vehicle body are different.

Figure 20:
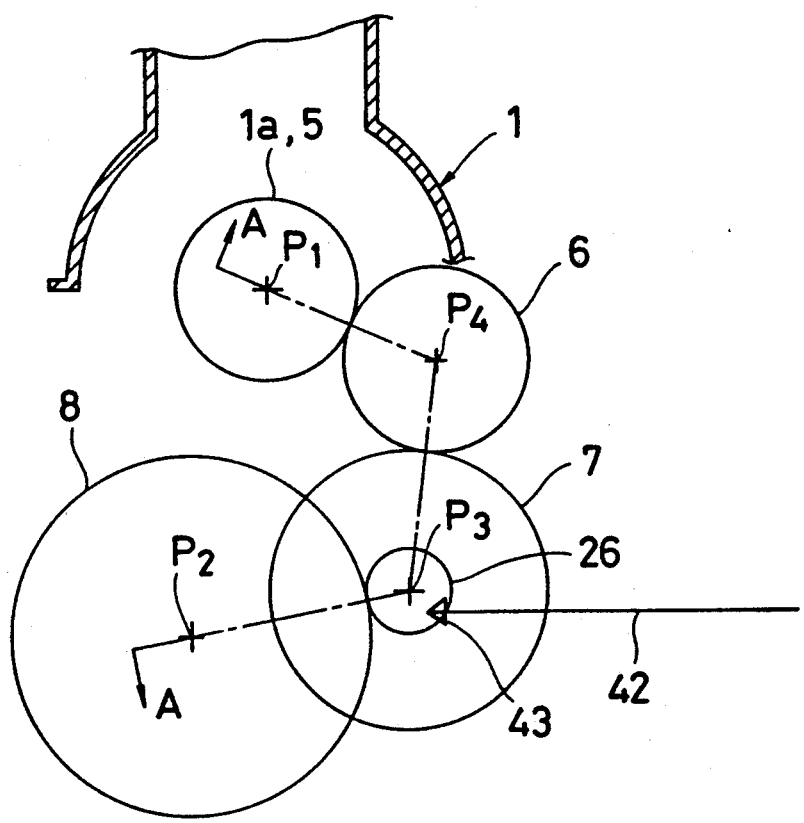
Figure 21:
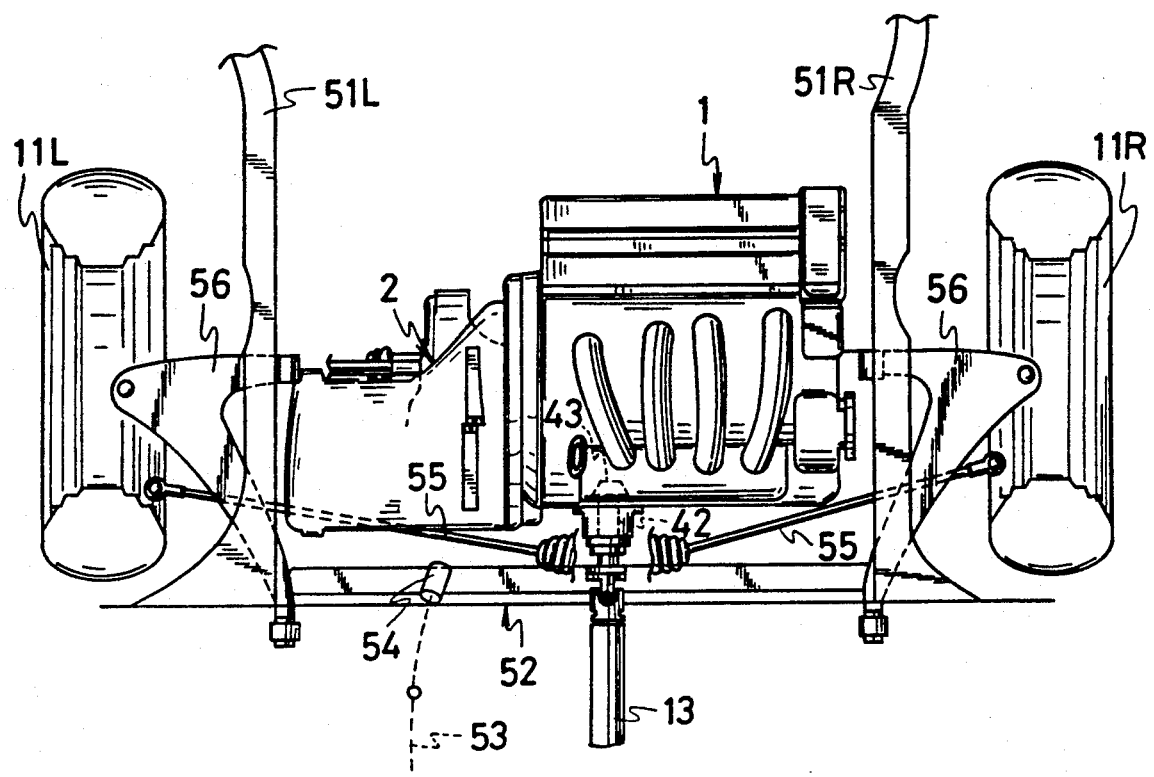
Figure 22:
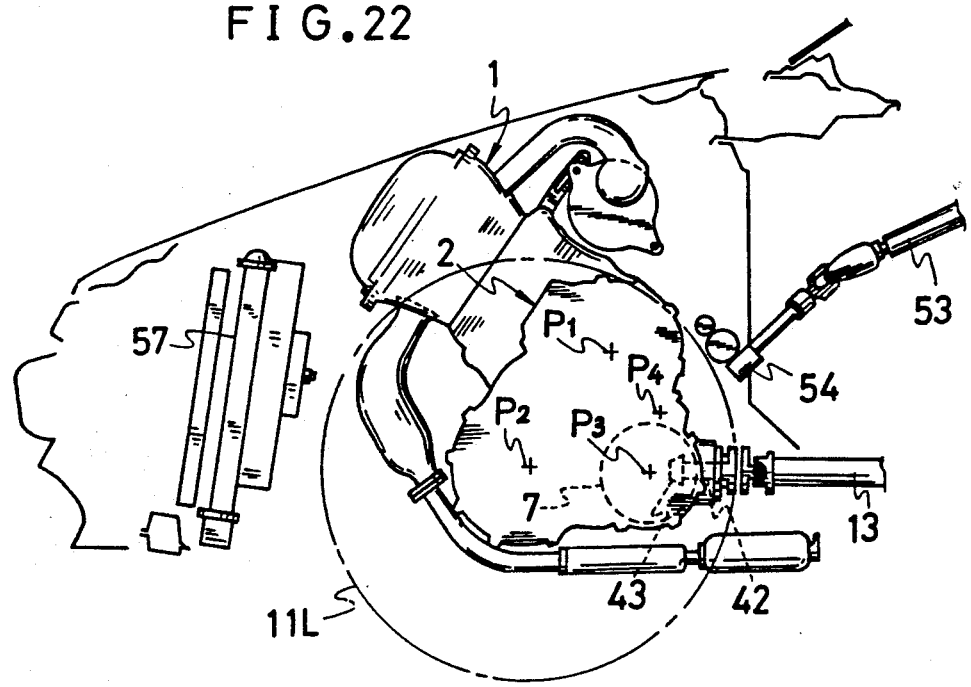

In FIG. 20 to FIG. 22, $P_1$ which is the axial center of the crank shaft 1a of the engine 1 and the main shaft 5 of the transmission 2 is offset in the rear direction of the vehicle body from $P_2$ and above $P_2$ which is the axial center of the axle of the front wheels 11L, 11R (namely, center of the front differential 8). $P_3$ which is the center of the center differential 7 and the axial center of the center shaft 26 is located in the rear direction of the vehicle body from $P_1$ which is the axial center of the main shaft of the transmission 2 and on almost the same level with $P_2$ which is the axle of the front wheels 11L, 11R. $P_4$ which is the axial center of the secondary shaft 6 of the transmission 2 is located above $P_3$ which is the axial center of the secondary shaft 26 but in the rear direction of the vehicle body from $P_1$ and below $P_1$ which is the axial center of the main shaft.

Figure 18:
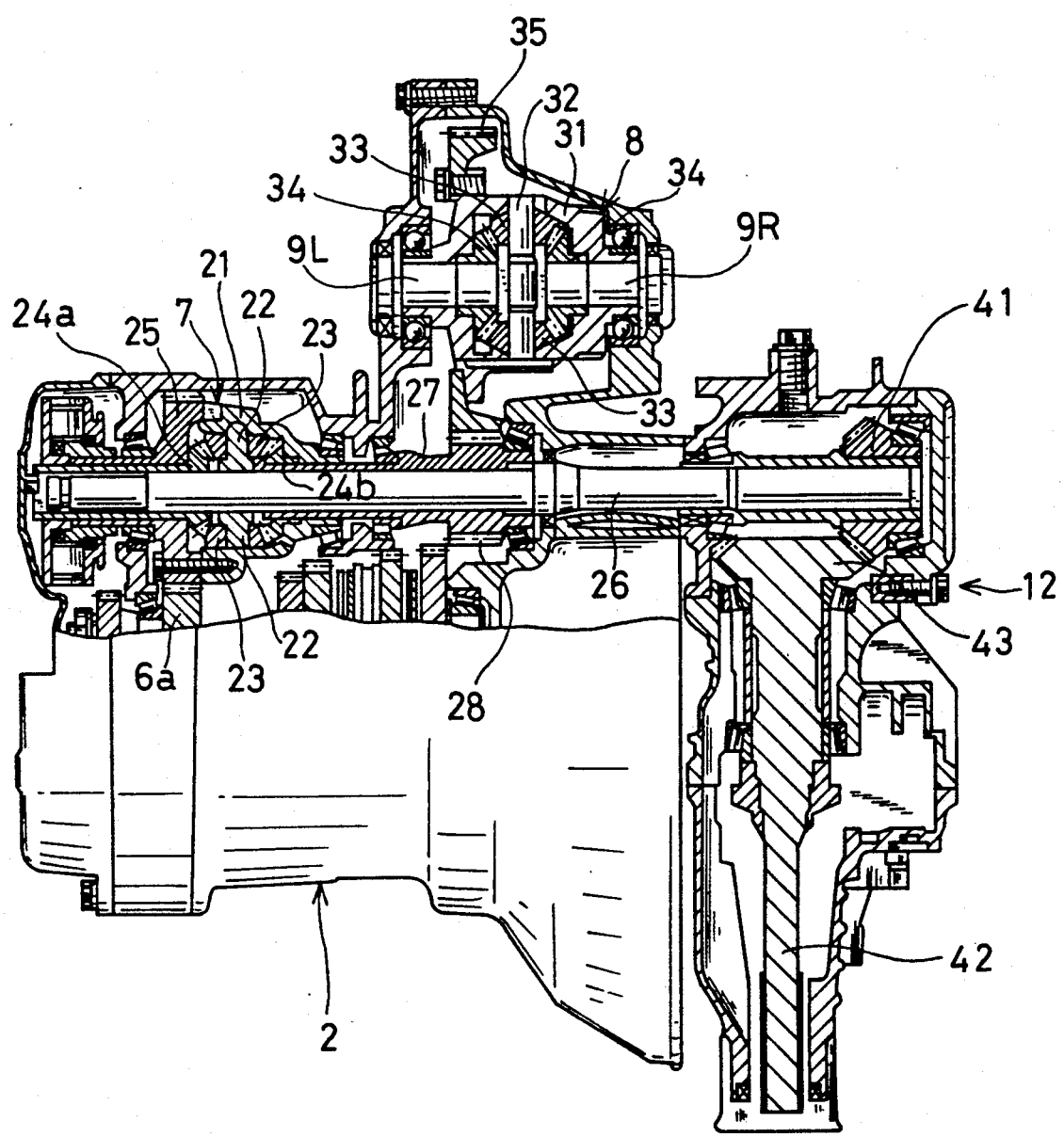
FIG. 18 to FIG. 22 show the fifth embodiment of the present invention, in which FIG. 18 corresponds to FIG. 1, FIG. 19 corresponds to FIG. 2, FIG. 20 corresponds to FIG. 3, FIG. 21 corresponds to FIG. 4, and FIG. 22 corresponds to FIG. 5.
Figure 19:
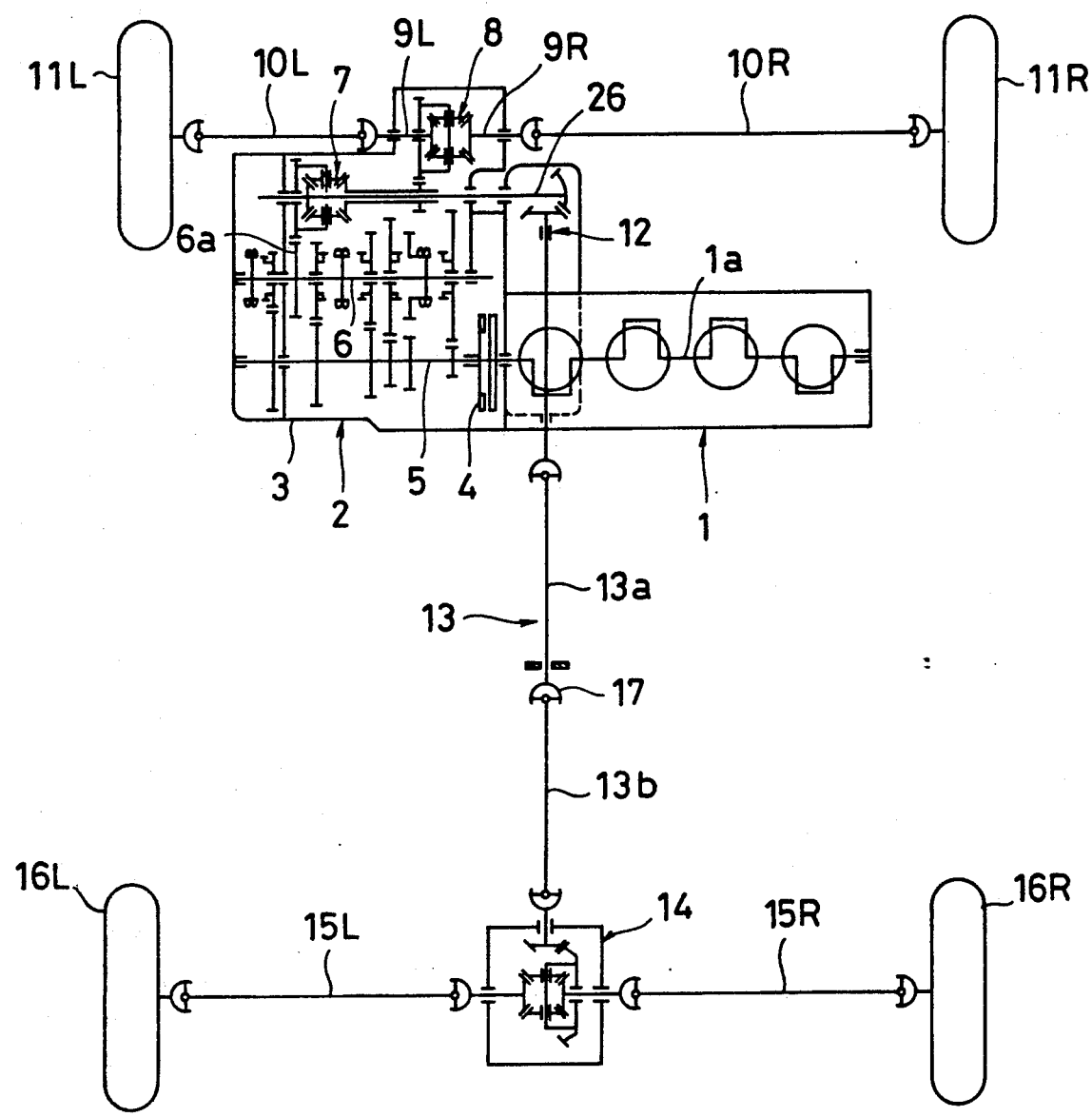

The transfer shaft 42 and the propeller shaft 13 are so arranged that both extend from the position on almost the same level with $P_3$ which is the axial center of the center shaft in the rear direction of the vehicle body and substantially horizontally. In the case of this embodiment, tie rods 55, etc. of the steering system 52 are arranged in the rear direction of the vehicle body from the engine 1 and the transmission 2. Arrangements of the engine 1, the transmission 2, etc. are different from the case of the first embodiment, but since FIG. 18 shows the development along the line A—A in FIG. 20, arrangements shown in FIG. 18 are the same as those shown in FIG. 1.

In the fifth embodiment, too, since the engine 1 and the transmission 2 are arranged offset in the rear direction of the vehicle body form $P_2$ which is the axial center of the axle of front wheels 11L, 11R (namely, center of the front differential 8), one-sided action of the vehicle body weight on the front wheels 11L, 11R can be relieved. Also, as the center differential 7 is arranged offset in the rear direction of the vehicle body from the main shaft 5 of the transmission 2, in the transfer mechanism 12 which takes out driving torque from the center differential 7 and transmits it to the propeller shaft 13 on the rear wheel side, there is no need of paying special attention to the interference with the transmission 2 and transmitting of driving torque to the rear wheel side can be carried out easily by a simple composition comprising one shaft 42 and a pair of bevel gears 41, 43.

Figure 23:
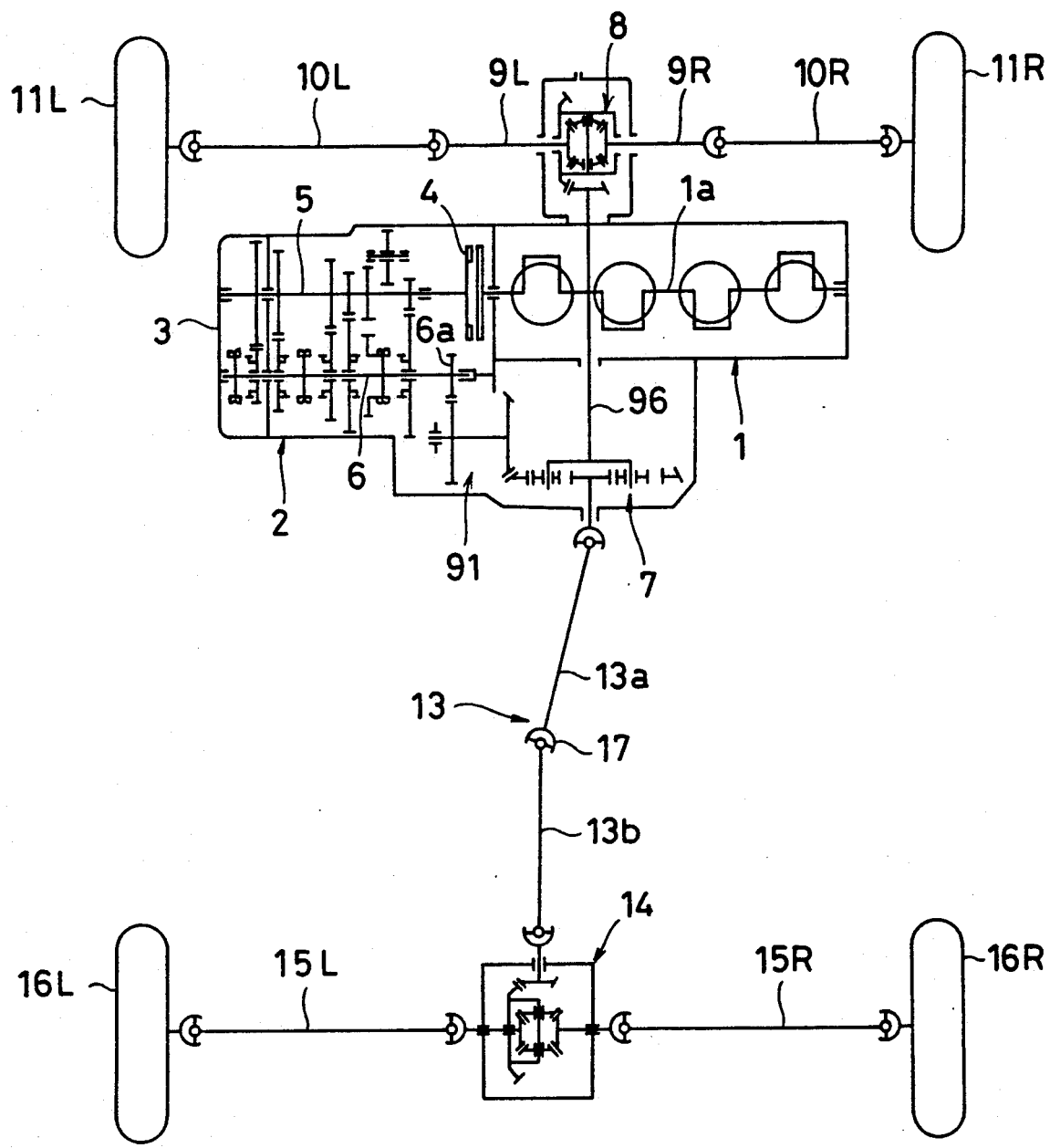
FIG. 23 to FIG. 27 show the sixth embodiment, in which FIG. 23 corresponds to FIG. 2, FIG. 24 corresponds to FIG. 1, FIG. 25 corresponds to FIG. 3, FIG. 26 corresponds to FIG. 4, and FIG. 27 corresponds to FIG. 5.
Figure 24:
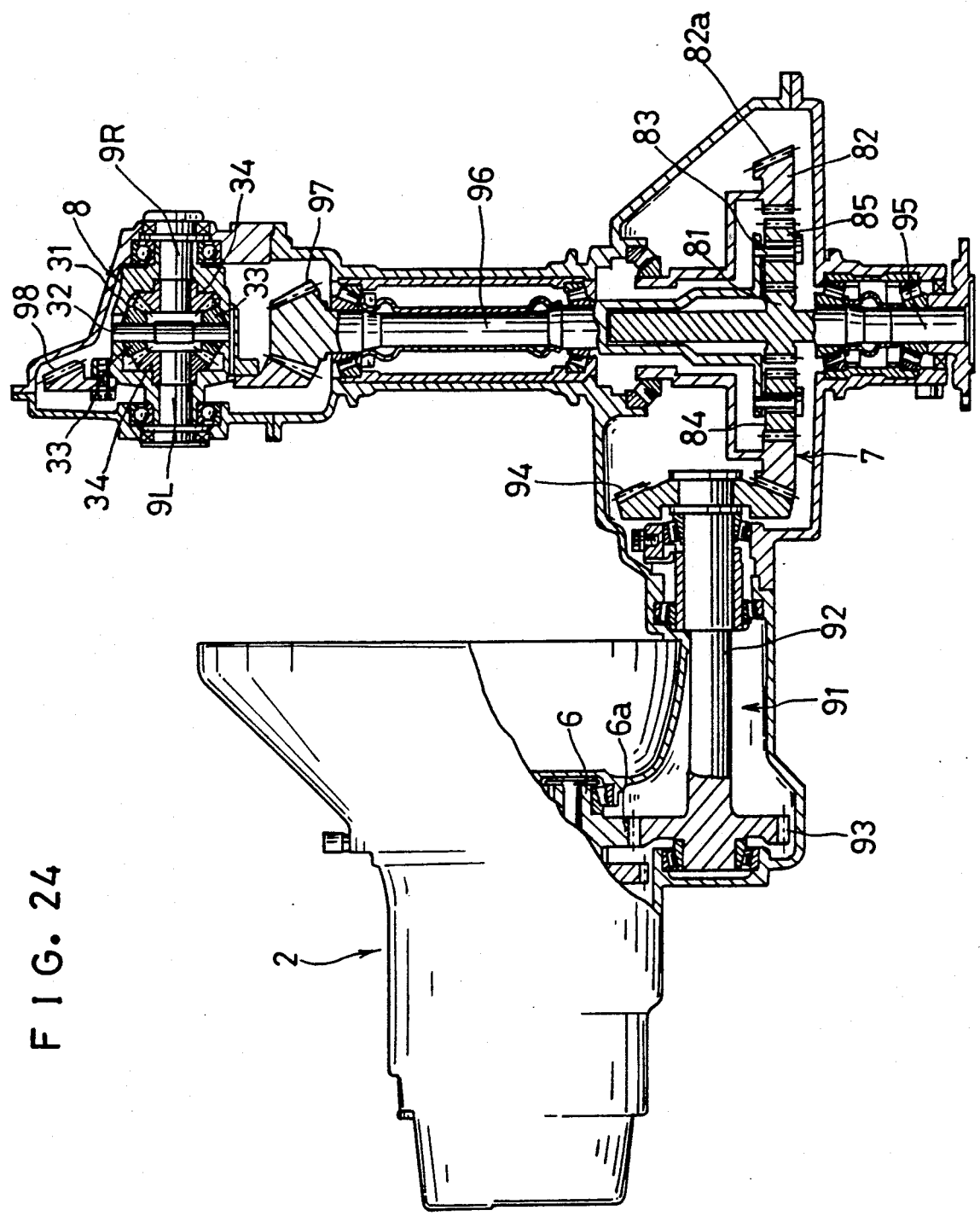

FIG. 23 and FIG. 24 show a four-wheel-drive system of the sixth embodiment of the present invention. In the case of the sixth embodiment, the center differential 7 comprises a planetary gear mechanism of double pinion type which makes a sun gear 81 and a ring gear 82 mesh with each other through the medium of pinion gears 84, 85 of two systems which are held by a pinion carrier 83.

A bevel gear part 82a is formed at the outer peripheral surface of the ring gear 82 and driving torque from the output gear 6a on the secondary shaft 6 of the transmission 2 is input in the center differential 7 (ring gear 82) through the medium of a transmitting gear mechanism 91 and the bevel gear part 82a. The transmitting gear mechanism 91 comprises a shaft 92 which is arranged in the direction of vehicle body width and in parallel with the main shaft 5 and the secondary shaft 6 of the transmission 2, a first gear 93 which is arranged rotatably with one end of the shaft 92 and meshes with the output gear 6a and a second gear 94 which is arranged rotatably with the other end of the shaft 92.

The sun gear 81 is arranged rotatably with a transfer shaft 95 for front wheels and a part of driving torque from the center differential 7 (sun gear 81) is output to the propeller shaft 13 on the rear wheel side through the medium of the transfer shaft 95. The pinion gear 83 is arranged rotatably with one end (rear end) of a transfer shaft 96 for the front wheels and the remaining part of driving torque from the center differential 7 (pinion carrier 83) is outputted to the front differential 8 (differential case 31) through the medium of the transfer shaft 96 and a pair of bevel gears 97, 98.

Figure 25:
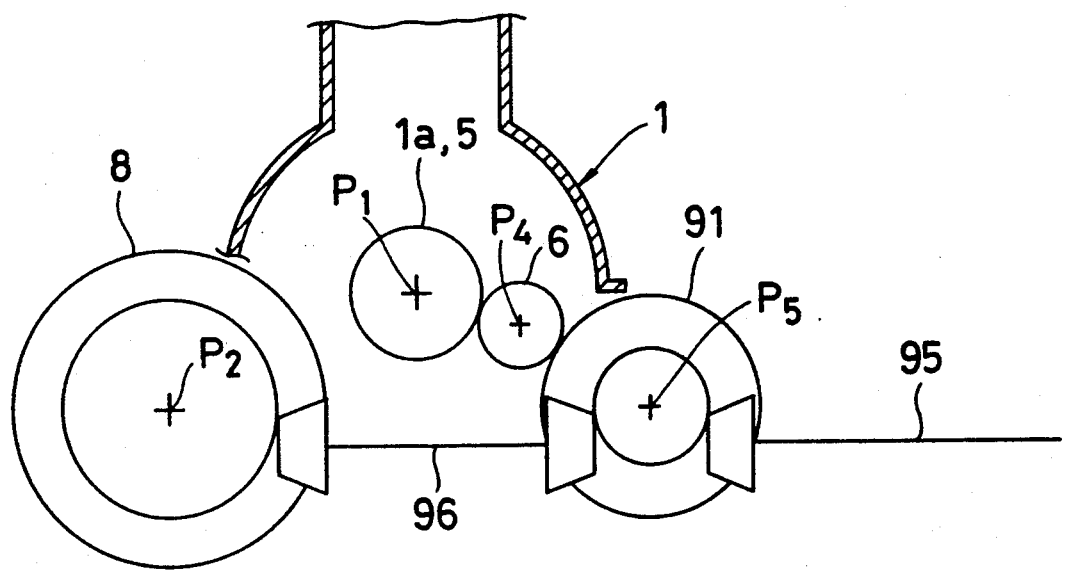
Figure 26:
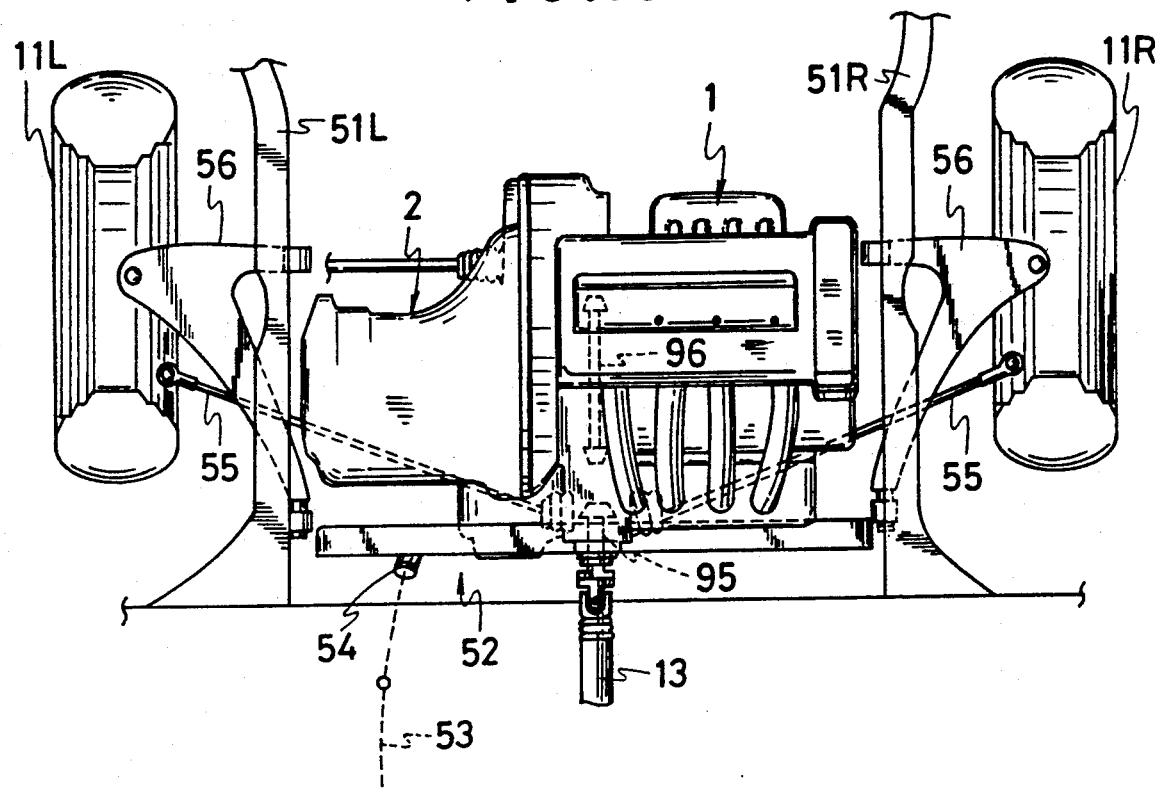
Figure 27:
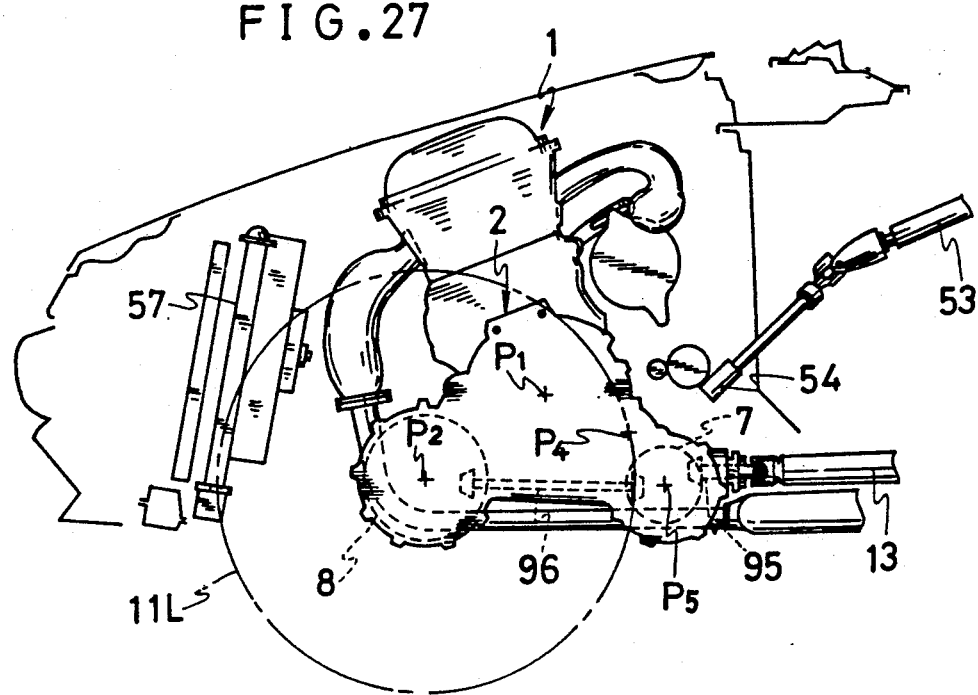
Figure 28:
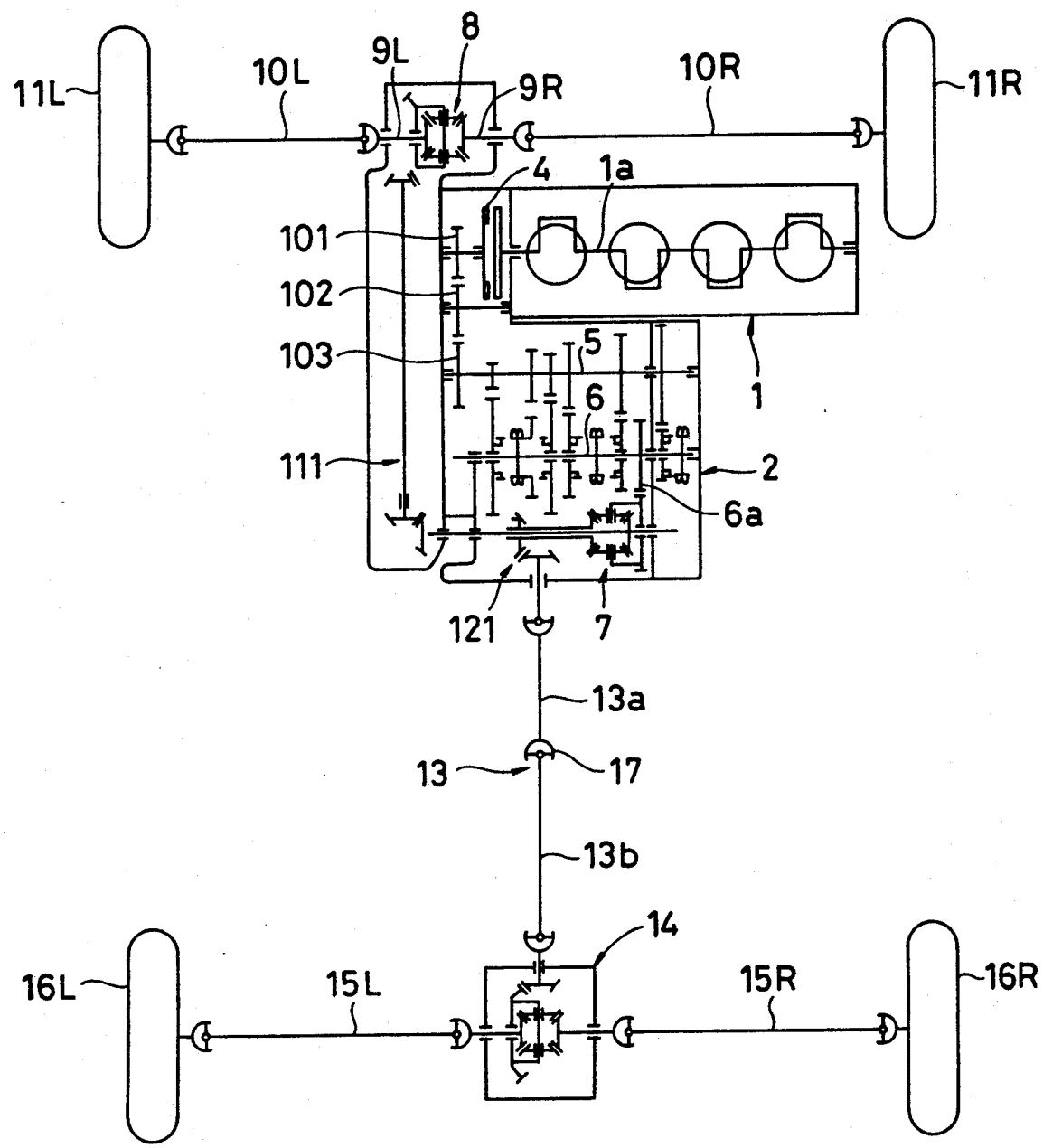
FIG. 28 to FIG. 32 show the seventh embodiment, in which FIG. 28 corresponds to FIG. 2, FIG. 29 corresponds to FIG. 1.
Figure 29:
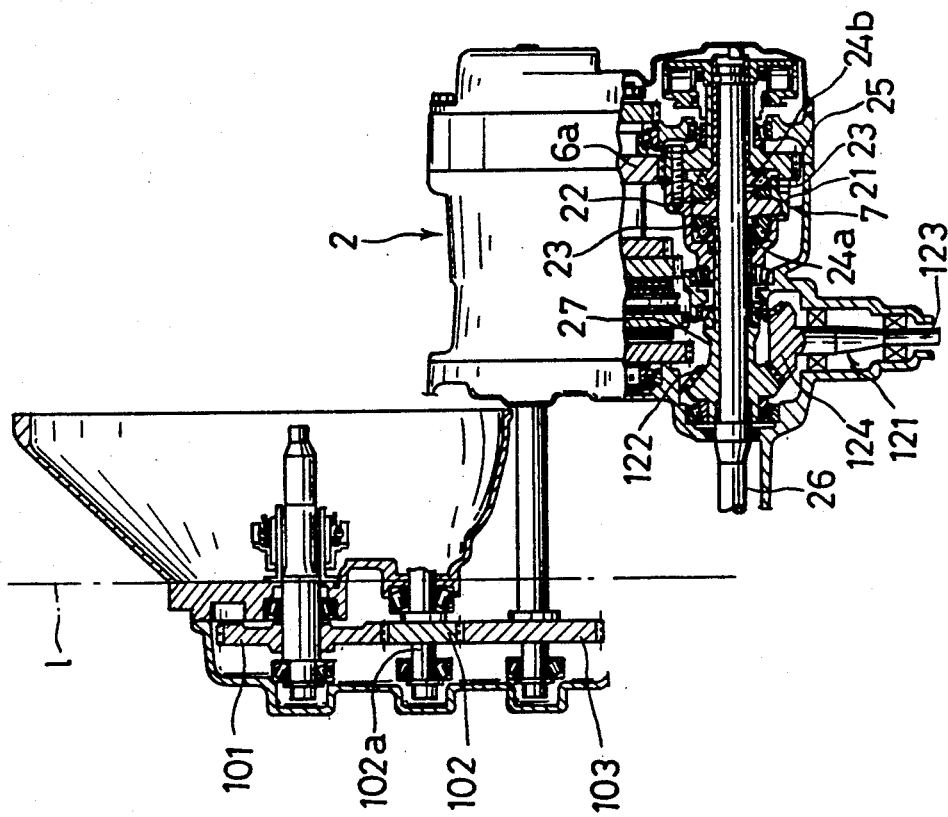
Figure 30:
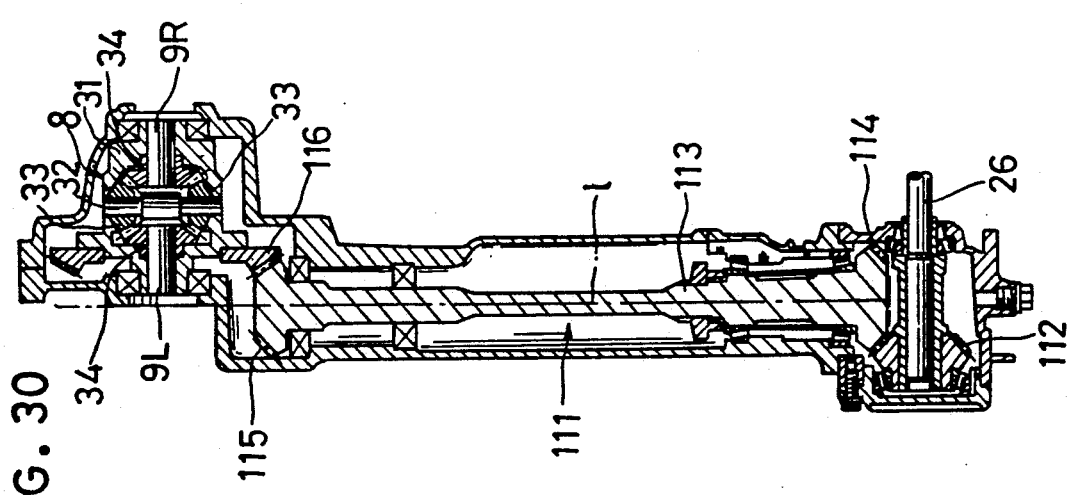
Figure 31:
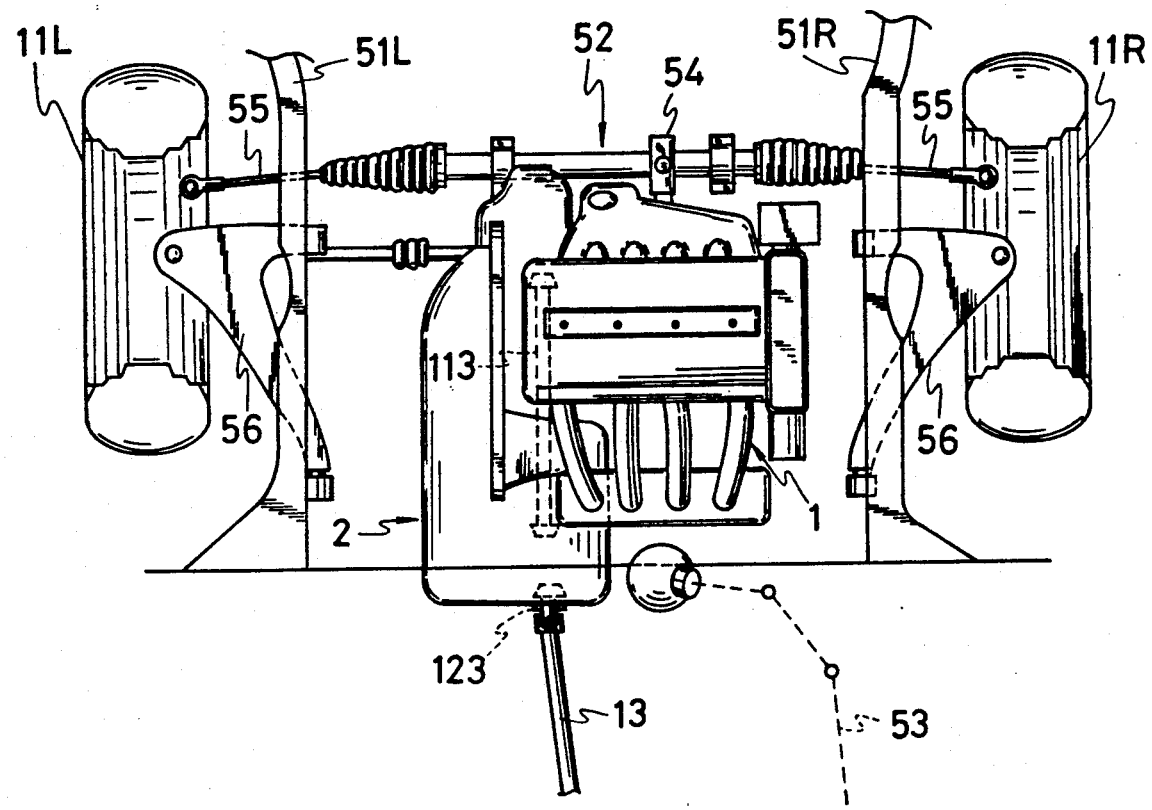

In the case of the sixth embodiment, arrangements of the engine 1, the transmission 2, etc. at the front part of the vehicle body are shown in FIG. 25 to FIG. 27. $P_1$ which is the axial center of the crank shaft 1a of the engine 1 and the main shaft 5 of the transmission 2 is located in the rear direction of the vehicle body from $P_2$ and above $P_2$ which is the center of the front differential 8 positioned on the axle line of the front wheels 11L, and 11R and $P_4$ which is the axial center of the secondary shaft 6 of the transmission 2 is located in the rear direction of the vehicle body from $P_1$ and below $P_1$ which is the axial center of the main shaft 5. $P_5$ which is the axial center of the transmission gear mechanism 91 is located in the rear direction of the vehicle body from $P_4$ which is the axial center of the secondary shaft 6 and on almost the same level with $P_2$ which is the center of the front differential 8.

The transfer shaft 96 for the front wheels is so arranged that it extends in the longitudinal direction of the vehicle body and horizontally, between $P_2$ which is the center of the front differential 8 and $P_5$ which is the axial center of the shaft 92 of the transmitting gear mechanism 91, at the position which is almost the same level with $P_2$ and $P_5$. The transfer shaft 95 for rear wheels and the propeller shaft 13 are so arranged that both shafts extends in the rear direction of the vehicle body substantially horizontally from the position on almost the same level with $P_5$ which is the axial center of the shaft 92 of the transmitting gear mechanism. The transfer shaft 96 for the front wheels is so arranged that, when viewed in plane, it extends in the longitudinal direction of the vehicle body on the side where the engine 1 and the transmission 2 are connected to each other. The transfer shaft 95 for rear wheels is arranged on the extension line of the transfer shaft 96 for the front wheels.

In the case of the sixth embodiment, not only does it produce the same effect as the first embodiment but also it is made possible to set $P_1$ which is the axial center of the crank shaft 1a of the engine 1 and the main shaft 5 of the transmission 2 at about the center of the center differential 7 (namely, set low on almost the same level with $P_2$ which is the axial center of the front axle) by arranging the front differential 8 and the center differential 7 separately from each other with the engine 1 therebetween but connecting them via the transfer shaft 96 for the front wheels for the transmitting of motive power. Thus, it is possible to reduce the height of the vehicle.

FIG. 28 to FIG. 32 show the seventh embodiment of the present invention. In the case of the seventh embodiment, while the transmission 2 is arranged in the rear direction of the vehicle body from the engine 1, it is so composed that driving torque of the engine 1 is transmitted from an output gear 101 provided on the same axis as the crank shaft 1a to an input gear 103 provided rotatably with the main shaft 5 of the transmission 2 through the medium of an idle gear 102.

It is so composed that while a part of driving torque of the center differential 7 is transmitted from the side gear 24b to the front differential 8 through the medium of the center shaft 26 and a transfer mechanism 111 for the front wheels, the remaining part of driving torque of the center differential 7 is transmitted from the side gear 24a to the propeller shaft 13 through the medium of the transmitting shaft 27 and a transfer mechanism 121 for the rear wheels. The transfer mechanism 111 for the front wheels comprises a first bevel gear 112 provided rotatably with one end of the center shaft 26, a second bevel gear 114 provided at a rear end of the transfer shaft 113 which is arranged in the longitudinal direction of the vehicle body and meshes with the first bevel gear 112, a third bevel gear 115 provided at a front end of the transfer shaft 113 and a fourth bevel gear 116 which is fitted rotatably to the differential case 31 of the front diffenrential 8 and meshes with the third bevel gear 115. The transfer mechanism 121 for the rear wheels comprises a drive bevel gear 122 provided at one end of the transmitting shaft 27 and a driven bevel gear 124 which is provided at a front end of the transfer shaft 123 arranged in the longitudinal direction of the vehicle body and meshes with the drive bevel gear 122.

Figure 32:
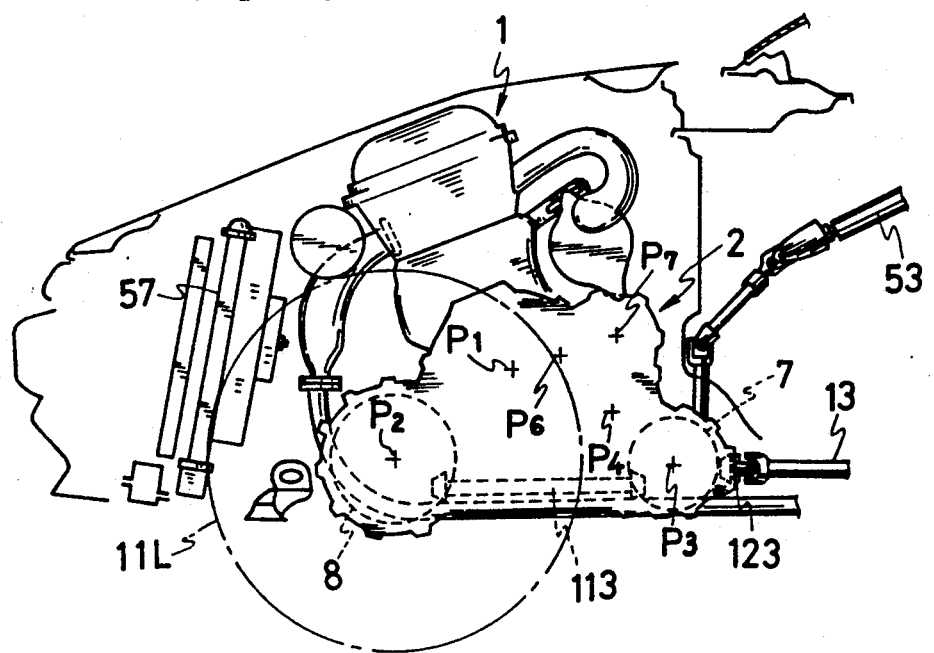

As shown by FIG. 32, the engine 1, the transmission 2, etc. are arranged in such a fashion that $P_1$ which is the axial center of the crank shaft 1a of the engine 1 is located in the rear direction of the vehicle body from $P_2$ and above $P_2$ which is the center of the front differential 8 positioned on the axle line of the front wheels 11L, 11R and $P_6$ which is the axial center of a support axis 102a (refer to FIG. 29) of the idle gear 102 and $P_7$ which is the axial center of the main shaft 5 of the transmission 2 are located in the rear direction of the vehicle body from $P_1$ which is the axial center of the crank shaft 1a. $P_4$ which is the axial center of the secondary shaft 6 of the transmission 2 is located below $P_7$ which is the axial center of the main shaft 5. $P_3$ which is the center of the center differential 7 and the axial center of the center shaft 26 is located in the rear direction of the vehicle body from $P_4$ and below $P_4$ which is the axial center of the secondary shaft 6 and on almost the same level with $P_2$ which is the center of the front differential 8.

The transfer shaft 113 of the transfer mechanism 111 for the front wheels is arranged in the longitudinal direction of the vehicle body and substantially horizontally, between $P_2$ which is the center of the front differential 8 and $P_3$ which is the center of the center differential 7, at the position slightly below the level of $P_2$ and $P_3$. The transfer shaft 123 of the transfer mechanism 121 for the rear wheels and the propeller shaft 13 are arranged in such a fashion that both shafts extend in the rear direction of the vehicle body and substantially horizontally from the position substantially on the same level with $P_3$ which is the center of the center differential 7. The transfer shaft 113 of the transfer mechanism 111 for the front wheels, when viewed in plane, is arranged in such a fashion that its axial line l is positioned at one end portion of the engine 1 and the transmission 2 (more particularly, at the part inner than a series of gear rows 101, 102, 103).

In the seventh embodiment, not only the engine 1 is arranged offset in the rear direction of the vehicle body from the front differential 8 but also the power unit center is arranged in the rear direction of the vehicle body from the front wheels 11L, 11R by arranging the transmission 2 in the rear direction of the vehicle body from the engine 1. Therefore, one-sidedness of the vehicle body weight to the front wheels 11L, 11R can be relieved still more.

Figure 33:
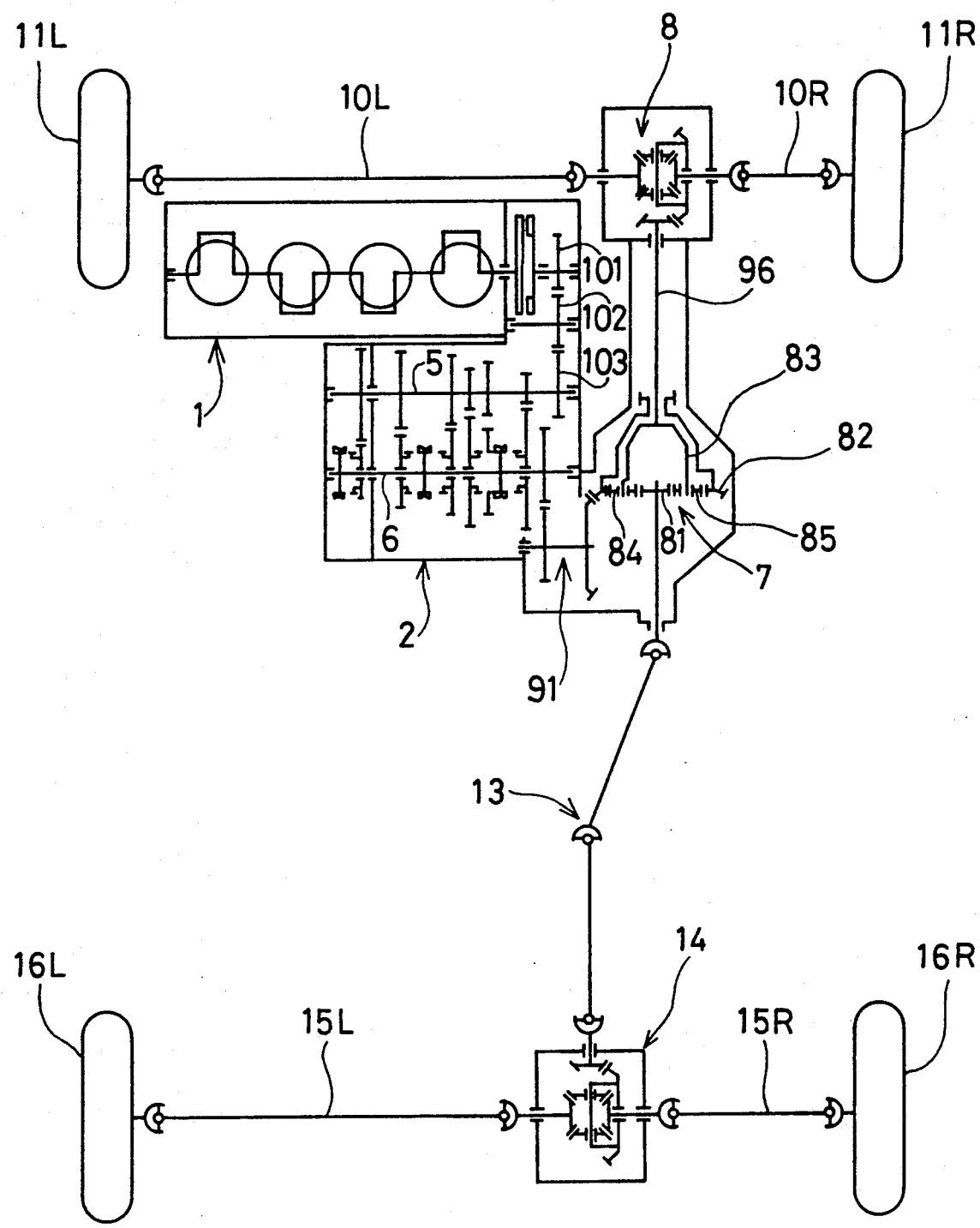
FIG. 33 shows the eighth embodiment and corresponds to FIG. 2.
Figure 34:
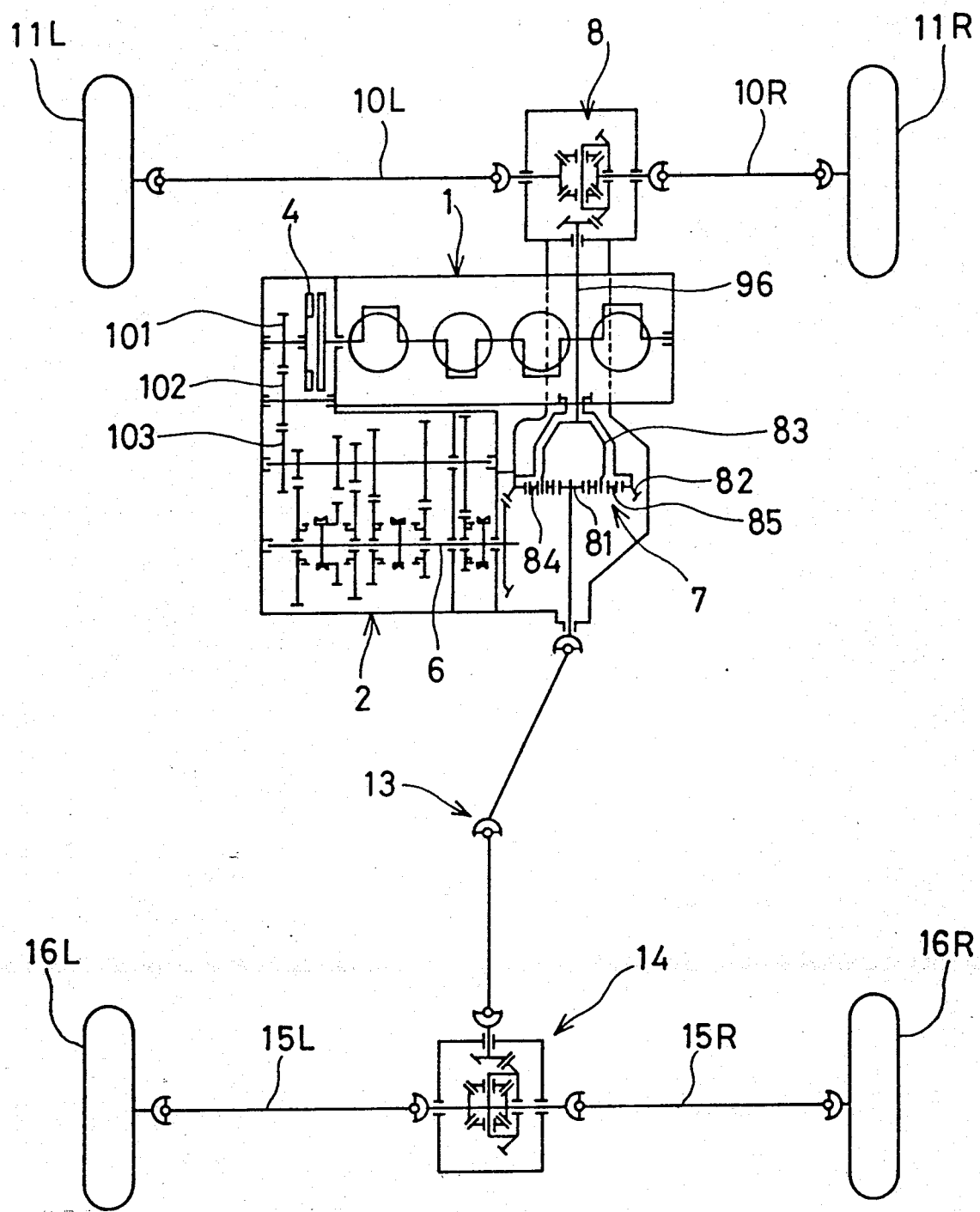
FIG. 34 shows the ninth embodiment and corresponds to FIG. 2.

FIG. 33 and FIG. 34 show the eighth and ninth embodiments respectively. These embodiments relate to the modification of the seventh embodiment. Similarly to the sixth embodiment, in each of these embodiments the center differential 7 comprises a planetary gear mechanism of double pinion type in which the sun gear 81 and the ring gear 82 mesh with each other through the medium of pinion gears 84, 85 of two systems which are held by the pinion carrier 83. The transfer shaft 96 which transmits a part of driving torque of the center differential 7 to the front differential 8 is arranged in such a fashion that it extends in longitudinal direction of the vehicle body at an end of the right side of the engine 1 and the transmission 2 in the case of the eight embodiment shown by FIG. 8 and in the case of the ninth embodiment shown by FIG. 34, it extend in the longitudinal direction of the vehicle body below the engine 1.

What is claimed is:

1. A four-wheel-drive motor vehicle of transversely-disposed engine type wherein the improvement comprises:

said transverse engine being disposed at a front part of a body of said vehicle such that a front differential of said vehicle which distributes motive power from a center differential of said vehicle to right and left front wheels of said vehicle is arranged on an axle of said front wheels and said engine and a transmission of said vehicle are located rearwardly of said front differential, and an axial center of said transmission is provided to the rear of and above an axial center of said center differential; and wherein said axial center of said center differential is offset in a vertical direction relative to said axial center of said front differential.

2. A four-wheel-drive motor vehicle of transversely-disposed engine type wherein the improvement comprises:

said transverse engine being disposed at a front part of a body of said vehicle such that a front differential of said vehicle which distributes motive power from a center differential of said vehicle to right and left front wheels of said vehicle is arranged on an axle of said front wheels and said engine and a transmission of said vehicle are located rearwardly of said front differential; and wherein an axial center of said transmission and the axial center of said center differential are offset in a vertical direction relative to each other and the axial center of the center differential is provided above the axial center of the transmission.

3. A four-wheel-drive motor vehicle of transversely-disposed engine type wherein the improvement comprises:

said transverse engine being disposed transversely at a front part of a body of said vehicle such that a front differential of said vehicle which distributes motive power from a center differential of said vehicle to right and left front wheels of said vehicle is arranged on an axle of said front wheels and said engine and a transmission of said vehicle are located rearwardly of said front differential; and wherein axial centers of said center differential and said front differential are offset relative to each other.

4. A four-wheel-drive motor vehicle of transversely-disposed engine type as defined in claim 3, wherein the axial center of the center differential is located in the rear direction of the vehicle body from the axial center of the front differential.

5. A four-wheel-drive motor vehicle of transversely-disposed engine type as defined in claim 3, wherein the axial center of the center differential is provided in the rear direction of the vehicle body from the axial center of the front differential.

6. A four-wheel-drive motor vehicle of transversely-disposed engine type as defined in claim 4, wherein the axial center of the transmission is provided in the rear of and above the axial center of the center differential.

7. A four-wheel-drive motor vehicle of transversely-disposed engine type as defined in claim 5, wherein the axial center of the transmission is provided in the rear of and above the axial center of the center differential.

8. A four-wheel-drive motor vehicle of transversely-disposed engine type as defined in claim 4, wherein the axial center of the center differential is provided in the rear direction of the vehicle body from the axial center of the transmission.

9. A four-wheel-drive motor vehicle of transversely-disposed engine type wherein the improvement comprises:

said transverse engine being disposed at a front part of a body of said vehicle such that a front differential of said vehicle which distributes motive power from a center differential of said vehicle to right and left front wheels of said vehicle is arranged on an axle of said front wheels and said engine and a transmission of said vehicle located rearwardly of said front and center differentials.

10. A four-wheel-drive motor vehicle of transversely-disposed engine type wherein the improvement comprises:

an engine of said vehicle being disposed at a front part of a body of said vehicle such that a front differential of said vehicle which distributes motive power from a center differential of said vehicle to right and left front wheels of said vehicle is arranged on an axle of said front wheels and said engine and a transmission of said vehicle are arranged rearwardly of said front differential;

wherein axial centers of said center and front differentials are offset relative to each other;

said axial center of said center differential being located rearwardly of said axial center of said front differential; and wherein an axial center of said transmission is located rearwardly of and above said axial center of said center differential.

11. A four-wheel-drive motor vehicle of transversely-disposed engine type wherein the improvement comprises:

an engine of said vehicle being disposed at a front part of a body of said vehicle such that a front differential of said vehicle which distributes motive power from a center differential of said vehicle to right and left front wheels of said vehicle is arranged on an axle of said front wheels and said engine and a transmission of said vehicle are arranged rearwardly of said front differential;

wherein axial centers of said center and front differentials are offset relative to each other;

said axial center of said center differential being located rearwardly of said axial center of said front differential; and wherein said axial center of said center differential is located rearwardly of said axial center of said transmission.

12. A four-wheel-drive motor vehicle of transversely-disposed engine type as defined in claim 9, wherein the axial center of the transmission is provided in the rear of the axial center of the center differential.

* * * * *